(12) United States Patent  (10) Patent No.: US 8,498,500 B2
Hoshino et al.  (45) Date of Patent: Jul. 30, 2013

(54) IMAGE PROCESSING APPARATUS AND IMAGE PROCESSING METHOD

(75) Inventors: Masashi Hoshino, Kanagawa (JP); Shuichi Takada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/496,274

(22) PCT Filed: Apr. 28, 2010

(86) PCT No.: PCT/JP2010/003069
§ 371 (c)(1),
(2), (4) Date: Mar. 15, 2012

(87) PCT Pub. No.: WO2011/033696
PCT Pub. Date: Mar. 24, 2011

(65) Prior Publication Data
US 2012/0163732 A1  Jun. 28, 2012

(30) Foreign Application Priority Data
Sep. 18, 2009 (JP) .................................. 2009-217527

(51) Int. Cl.
*G06K 9/36* (2006.01)
(52) U.S. Cl.
USPC ........................................................ 382/284
(58) Field of Classification Search
USPC .......... 382/284, 293–298, 274; 345/629–641; 348/584–601
See application file for complete search history.

(56) References Cited

U.S. PATENT DOCUMENTS

| | | | |
|---|---|---|---|
| 6,434,265 B1 * | 8/2002 | Xiong et al. | 382/154 |
| 6,771,304 B1 * | 8/2004 | Mancuso et al. | 348/39 |
| 7,502,521 B2 * | 3/2009 | Sun et al. | 382/254 |
| 2002/0067418 A1 | 6/2002 | I | |
| 2004/0174385 A1 | 9/2004 | Ikeda et al. | |
| 2005/0195198 A1 | 9/2005 | Anderson et al. | |
| 2005/0195199 A1 | 9/2005 | Anderson et al. | |

FOREIGN PATENT DOCUMENTS

| | | |
|---|---|---|
| JP | 2002-175069 A | 6/2002 |
| JP | 2002-229554 A | 8/2002 |
| JP | 2003-233809 A | 8/2003 |
| JP | 2007-526585 A | 9/2007 |

OTHER PUBLICATIONS

International Search Report for PCT/JP2010/003069 dated Jun. 1, 2010.

* cited by examiner

*Primary Examiner* — Yon Couso
(74) *Attorney, Agent, or Firm* — Pearne & Gordon LLP

(57) ABSTRACT

An image processing apparatus includes a blending layout information generating unit that generates blending layout information indicative of overlay information in a blended image of plural source images, a source necessity information generating unit that generates source necessity information indicative of unnecessary areas on the source image overwritten by the blending process, a source necessity information storing memory, and a source read masking unit that conducts a read masking control. A process of generating the blending layout information and the source necessity information, and a process of conducting the read masking control are executed in different frame processing periods, separately, to reduce a throughput necessary for generation of the source necessity information.

16 Claims, 16 Drawing Sheets

FIG. 7

| SOURCE IMAGE | TRANSFORMING PROCESS | BLENDING PROCESS |
|---|---|---|
| lyr0 | ENLARGEMENT | OVERWRITE (LOWERMOST LAYER) |
| lyr1 | LEFT 90 DEGREES ROTATION | OVERWRITE (NO TRANSPARENT COLOR) |
| lyr2 | SHRINKING | OVERWRITE (NO TRANSPARENT COLOR) |
| lyr3 | IMAGE QUALITY ADJUSTMENT | α-BLENDING | lyrnum[2:0] : NECESSARY SOURCE IMAGE NO. OF LOWERMOST LAYER
(MAXIMUM NUMBER OF SOURCE IMAGES IS 8 IMAGES)

720

| LEVEL | BLENDED IMAGE SIZE (W OR H) [PIXEL] | BLOCK SIZE (W OR H) [PIXEL] |
|---|---|---|
| 0 | $64 \geq X > 0$ | 1 |
| 1 | $128 \geq X > 64$ | 2 |
| 2 | $256 \geq X > 128$ | 4 |
| 3 | $512 \geq X > 256$ | 8 |
| 4 | $1024 \geq X > 512$ | 16 |
| 5 | $2048 \geq X > 1024$ | 32 |
| 6 | $4096 \geq X > 2048$ | 64 |
| 7 | $8192 \geq X > 4096$ | 128 | lyr0 811, lyr1 812, lyr2 813, lyr3 814

READ UNNECESSITY AREA

920

| LEVEL | SOURCE IMAGE SIZE (W OR H) [PIXEL] | BLOCK SIZE (W OR H) [PIXEL] |
|---|---|---|
| 0 | $64 \geq X > 0$ | 1 |
| 1 | $128 \geq X > 64$ | 2 |
| 2 | $256 \geq X > 128$ | 4 |
| 3 | $512 \geq X > 256$ | 8 |
| 4 | $1024 \geq X > 512$ | 16 |
| 5 | $2048 \geq X > 1024$ | 32 |
| 6 | $4096 \geq X > 2048$ | 64 |
| 7 | $8192 \geq X > 4096$ | 128 |

IMAGE PROCESSING APPARATUS AND IMAGE PROCESSING METHOD

TECHNICAL FIELD

The present invention relates to an image forming apparatus and an image processing method, which receive a plurality of images stored in a memory, and execute a transforming process and a blending process such as rotation, enlargement, or reduction to generate a blended image such as a display image.

BACKGROUND ART

There has been a conventional image processing apparatus that executes the blending process in which a superimposed portion of a source image of a lower layer is removed, the source image is divided into a divided image to calculate a division display address, and a source address is calculated according to the division display address to read the source image from an image memory (for example, refer to Patent Literature 1). In the image processing apparatus, the source image is divided into the divided image from which the superimposed portion of the source image of the lower layer is removed so that data of the source image overwritten and lost by a source image of an upper layer through the blending process is not read from the image memory. Through the above processing, a traffic to the memory is reduced to enable a reduction in the costs or electric power of the memory.

FIG. 18 is a diagram illustrating a configuration of the image processing apparatus in a conventional example disclosed in Patent Literature 1. Referring to FIG. 18, an attribute memory 1810 is a memory that stores attribute information including source addresses indicative of data areas of the respective source image data, display addresses indicative of areas on a display screen, and display priorities, which are data for forming the blended image. An image memory 1830 is a memory that stores source image data therein, and a display screen 1820 is a display screen that blends the source images together. A rendering circuit 1840 reads the source image stored in the image memory 1830 on the basis of the attribute information stored in the attribute memory 1810, forms the blended image, and outputs the image as the display screen.

The rendering circuit 1840 forms the display image shown in the display screen 1820 from source images att1, att2, att3, and att4 stored in the image memory 1830. The display priorities become lower in the stated order of att1, att2, att3, and att4, and att1 is a source image located in the lowest layer, and att4 is a source image located in the highest layer. In the display screen 1820, respective pixel areas 1821, 1822, and 1823 of shaded parts are area in which the source images can be superimposed on each other through the blending process. The rendering circuit 1840 executes the blending process on a line basis of the display screen.

FIG. 19 is a diagram illustrating an image division process of an area between v1 and v2 of the display screen 1820. Through a source image division process 1850 between v1 and v2, in the area between v1 and v2 of the display screen 1820, the source image is divided into the divided images. In the source image division process 1850 between v1 and v2, rectangular areas become the divided images obtained by dividing the respective source images of att1, att2, att3, and att4, and the source image att1 becomes the divided image in which areas in an h2-h3 interval and an h4-h5 interval corresponding to the pixel areas 1821 and 1822 of the superimposed areas are removed. After the divided image has been generated, the display address of the generated divided image is calculated, the source address is calculated from the calculated display address to read the source image from the image memory 1830, and the source image is output to the memory that stores data of the display screen 1820.

Citation List

Patent Literature

Patent Literature 1: JP-A-2002-229554

SUMMARY OF INVENTION

Technical Problem

In the above-mentioned conventional image processing apparatus, a treatment for a transforming process such as an enlargement process or a reduction process is not assumed, and when the combination of the transforming process and the blending process is applied to the image processing apparatus, there arises a new problem.

As one example, let us consider a case in which the enlargement process is executed as the transforming process, and a plurality of images is combined together after the enlargement process. When the enlargement process is executed, one pixel of the source image before the enlargement process is used for a plurality of pixels after the enlargement process. In the enlargement process, for example, when filter arithmetic operations of plural taps is implemented, adjacent pixels of the same number as the number of taps need to be referred. Also, in the enlargement process, the same pixels as those of an input image before enlargement are repetitively used for generation of the plural adjacent pixels after the enlargement process. Thereafter, the process of blending the source image that has been subjected to the enlargement process and another source image is implemented.

For that reason, when the transforming process and the blending process are implemented in combination, in order to determine whether each pixel needs to be read (read), or not, that is, whether read is necessary, or not, the pixel area used for pixel generation of the source image after the transforming process (after enlargement process in this example) is identified. Whether the identified plural pixels are necessary, or not, is determined by confirming an overlay relationship with another source image that has been subjected to the transforming process in the blending process taking an output position in the display image into account, and whether the identified plural pixels need to be read, or not, is determined according to the determination results of all the plural pixels. If the determination results of all the plural pixels after the transforming process are indicative of unnecessity, the pixels of the subject source image before the transforming process do not need to be read.

In the conventional example disclosed in Patent Literature 1, because only the blending process is assumed, the pixels of the display address in the display image and the pixels of the source address in the source image correspond one-to-one with each other. On the contrary, when the same process is implemented in the image processing apparatus combining the transforming process and the blending process together, the pixels of the source address in the source image and the pixels of the display address in the source image that has been subjected to the transforming process have one-to-many correspondence. A process of determining whether one pixel of the source image needs to be read, or not, needs to be implemented for plural pixels with respect to each pixel. For that reason, there arises such a problem that computation in the determining process is increased.

Also, in the above image processing apparatus, the processing is executed on the line basis or a block basis of the plural pixels. Also, in order to improve the processing efficiency, there is frequently applied a circuit configuration which realizes a series of processing through pipeline processing of the pixel basis. When the pipeline processing of the pixel basis is applied to the image processing apparatus, in order to implement the image processing apparatus without deteriorating a throughput of the image processing apparatus, the determining processes of the same number as that of the plural pixels must be processed in parallel, resulting in such a problem that the circuit scale for the determining process is increased. Alternatively, in order to suppress an increase in the circuit scale, when the determining processes of the same number as that of the plural pixels are not processed in parallel, but sequentially processed every pixel, the throughput of the image processing apparatus is largely deteriorated at a magnification that is an inverse number of the plural pixels.

The present invention has been made in view of the above circumstances, and an object of the present invention is to provide an image processing apparatus and an image processing method, which enable occurrence of useless memory accesses to be suppressed by preventing data of unnecessary source images overwritten by a source image of an upper layer from being read from an image memory, without causing an increase in circuit scale and a reduction in processing throughput even in a process combining a transforming process and a blending process together.

Solution to Problem

According to the present invention, there is provided an image processing apparatus, including: a transform processing unit that receives a plurality of source images, and executes a transforming process on respective source images of the plurality of source images, individually; a blend processing unit that executes a blending process on the plurality of transformed source images output by the transform processing unit, and generates a blended image; a control information storing unit that stores control information related to the transforming process of the transforming processor and the blending process of the blend processing unit; a blending layout information generating unit that generates blending layout information indicative of overlay information on the plurality of transformed source images output from the transform processing unit in the blended image; a source necessity information generating unit that generates source necessity information indicative of unnecessary areas of the plurality of source images for overwriting through the blending process of the blend processing unit in the plurality of source images, with reference to the blending layout information output by the blending layout information generating unit; a source necessity information storing memory that stores the source necessity information output by the source necessity information generating unit; and a source read masking unit that executes a read masking control so as not to implement a read access to the source image data of the unnecessary area with reference to the source necessity information in the source necessity information storing memory at the time of reading the respective source images of the plurality of source images from an image memory.

Also, according to the present invention, the above image processing apparatus includes a control unit that sequentially processes a plurality of frames, activates the source read masking unit at the time of the frame processing subsequent to the frame processing in which the source necessity information is generated, executes the read masking control on the source image data of the unnecessary area by using the source necessity information stored in the source necessity information storing memory, in which the control unit executes a process of activating the blending layout information generating unit to generate the blending layout information, and a process of activating the source necessity information generating unit to generate the source necessity information by using the blending layout information while repetitively executing the frame processing including the transforming process and the blending process, in one frame processing period or a plurality of frames processing period.

According to the present invention, there is provided an image processing method of receiving a plurality of source images, reading image data of the respective source images from an image memory, executing a transforming process on the respective source images, individually, and executing a blending process on the plurality of transformed source images to generate a blended image, the image processing method comprising:

generating blending layout information indicative of overlay information on the plurality of transformed source images in the blended image; generating source necessity information indicative of unnecessary areas of the plurality of source images for overwriting through the blending process in the plurality f source image, with reference to the blending layout information; executing a read masking control so as not to implement a read access to the source image data of the unnecessary area with reference to the source necessity information at the time of reading the image data of the respective source images from the image memory, in which a plurality of frames is sequentially processed, and the read masking control is executed at the time of the frame processing subsequent to the frame processing in which the source necessity information is generated.

With the above configuration, the process of generating the blending layout information or the process of generating the source necessity information, and the process of executing the read masking control of the image data of the unnecessary source image can be executed in different frame processing periods, separately, and in the frame processing after the generation of the source necessity information has been completed, the read masking control of the unnecessary source image data can be continued. As a result, a throughput required for generating the source necessity information used for the read masking control is reduced, and the process combining the transforming process and the blending process for the images can be executed without causing an increase in circuit scale and a reduction in processing throughput. Also, the read access to the unnecessary source image data can be suppressed by the read masking control, and a memory bandwidth necessary in reading from the image memory can be reduced. Also, with the use of the blending layout information, the overlay determining process of one-to-many pixels related to the transformed source images can be reduced.

Advantageous Effects of Invention

According to the present invention, there can be provided the image processing apparatus and the image processing method, which enable the occurrence of the useless memory accesses to be suppressed by preventing data of the unnecessary source images overwritten by the source image of the upper layer from being read from the image memory, without causing an increase in the circuit scale and a reduction in the processing throughput even in the process combining the transforming process and the blending process together.

BRIEF DESCRIPTION OF DRAWINGS

FIG. 7 is a diagram illustrating processing contents related to the respective source images in the processing example of FIG. 6.

DESCRIPTION OF EMBODIMENTS

Hereinafter, embodiments of the present invention will be described with reference to the drawings.

Figure 1:
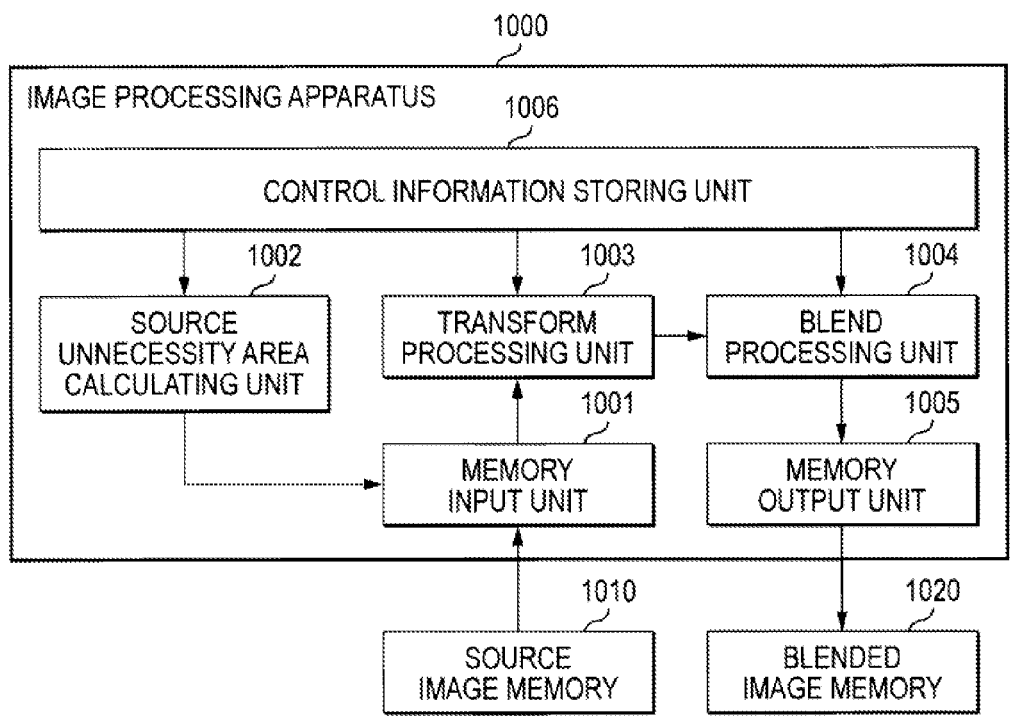
FIG. 1 is a block diagram illustrating a configuration example of an image processing apparatus that implements a process combining a transforming process and a blending process together.

First, a process combining a transforming process and a blending process which is implemented in this embodiment will be described with reference to a configuration example of an image processing apparatus. FIG. 1 is a block diagram illustrating the configuration example of the image processing apparatus that implements the process combining the transforming process and the blending process together.

An image processing apparatus 1000 includes a memory input unit 1001, a source unnecessity area calculating unit 1002, a transform processing unit 1003, a blend processing unit 1004, a memory output unit 1005, and a control information storing unit 1006. Also, the image processing apparatus 1000 is connected with a source image memory 1010 and a blended image memory 1020. The source image memory 1010 is a memory that stores source image data that is input to the image processing apparatus 1000 therein, and the blended image memory 1020 is a memory that stores blended image data output from the image processing apparatus 1000 therein.

The memory input unit 1001 is a memory interface unit that reads (reads) the source image data from the source image memory 1010, and the read source image data is input to the transform processing unit 1003. Also, the memory input unit 1001 does not execute an access to data not to be read under the control with reference to the source unnecessity area information from the source unnecessity area calculating unit 1002. In this example, control related to reading of the source image data functions as a masking of a read access to the source image memory 1010.

The source unnecessity area calculating unit 1002 calculates a source image area not to be read from the source image memory 1010. In this situation, the source unnecessity area calculating unit 1002 refers to control information including a variety of information and parameters related to the transforming process and blending process of an image data such as sizes before and after conversion, output positions, and an overlay order of the combination, and memory addresses on the source image memory 1010, of the respective source images, which is held in the control information storing unit 1006. Then, the source unnecessity area calculating unit 1002 calculates an address of the source image area not to be read, which is used only for generation of the pixels overwritten by the transformed source image located on the upper layer through the blending process, on the basis of those control information.

The transform processing unit 1003 subjects the respective source images input from the memory input unit 1001 to an image transforming process such as rotation, enlargement, reduction, or color substitution according to the control information held by the control information storing unit 1006, and outputs the transformed source images to the blend processing unit 1004.

The blend processing unit 1004 executes the blending process of α-blending so as to superimpose the transformed source images input from the transform processing unit 1003 on each other or overlap translucent images on each other according to the control information held by the control information storing unit 1006, generates a blended image data for one display image, and outputs the blended image data to the memory output unit 1005.

The memory output unit 1005 is a memory interface unit that outputs the blended image data input from the blend processing unit 1004 to the blended image memory 1020, and writes (writes) the blended image data therein.

In the image processing apparatus 1000 thus configured, the processing is executed on the line basis or a block basis of the plural pixels. Also, in order to improve the processing efficiency, there is frequently applied a circuit configuration which realizes a series of processing through a pipeline processing of the pixel basis.

Figure 2:
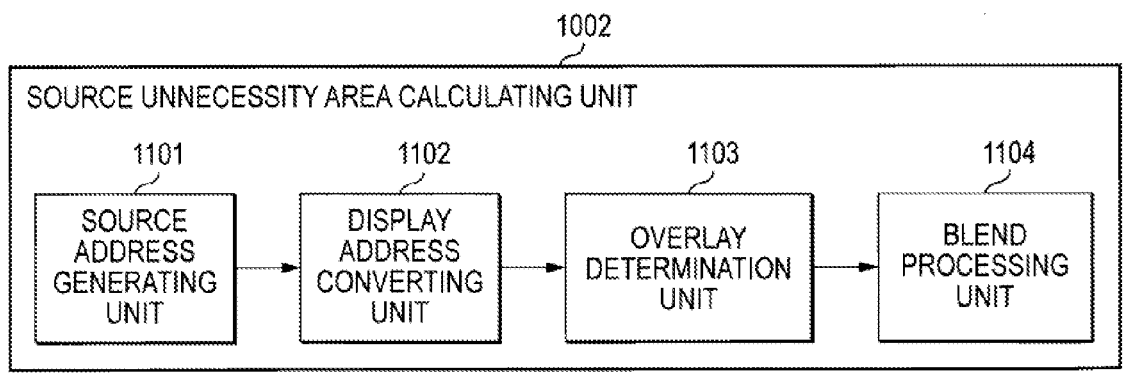
FIG. 2 is a diagram illustrating a configuration example of a source unnecessity area calculating unit in the image processing apparatus of FIG. 1.

FIG. 2 is a diagram illustrating one configuration example of the source unnecessity area calculating unit 1002 in the image processing apparatus 1000 of FIG. 1.

The source unnecessity area calculating unit 1002 includes a source address generating unit 1101, a display address converting unit 1102, an overlay determination unit 1103, and a source necessity determination unit 1104.

The source address generating unit 1101 increments pixel addresses corresponding to coordinates in a line direction in order, and outputs the pixel addresses to the display address converting unit 1102. The display address converting unit 1102 converts the pixel addresses into pixel addresses of the display image generated through the transforming process of the transform processing unit 1003 by the aid of the pixel data of the input pixel addresses, and outputs the pixel addresses on the display image to the overlay determination unit 1103. The overlay determination unit 1103 determines whether the input pixel addresses on the display screen are superimposed on the transformed source image of the upper layer, or not, and outputs the determination results to the source necessity determination unit 1104. If there is an overlay, the source necessity determination unit 1104 determines whether the pixels of the subject source image are necessary for the transforming process through the α-blending process or the transparent coloring process according to the input determination results. Then, if the source necessity determination unit 1104 determines that the pixel addresses of all the display images are unnecessary, the source necessity determination unit 1104 determines that the pixels of the source image to be determined do not need to be read.

Figure 3:
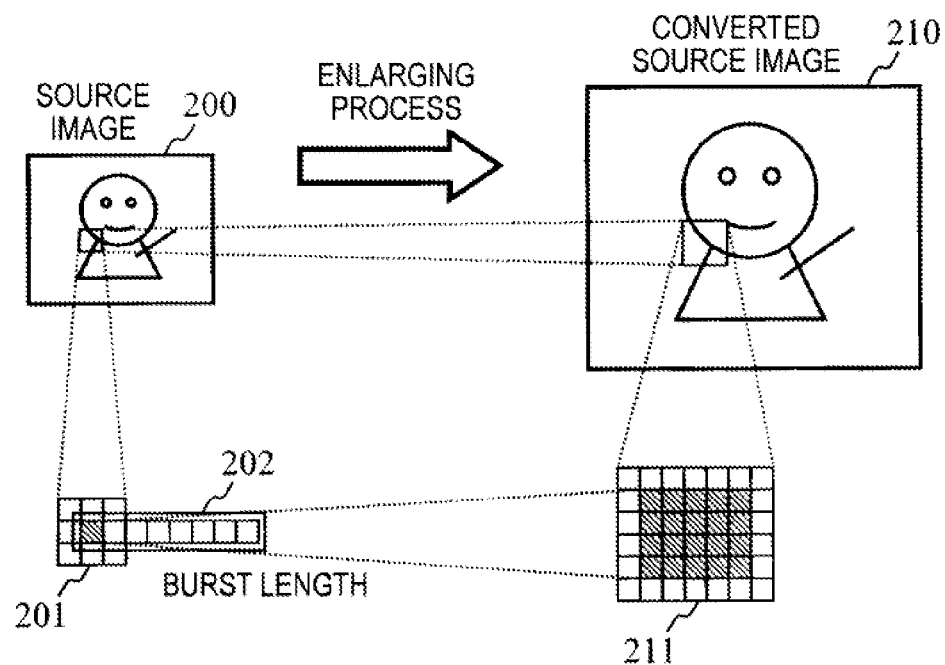
FIG. 3 is a diagram illustrating subject pixels for determining whether a source is necessary, or not, when an enlarging process and a blending process are implemented in combination.

Now, the operation of the image processing apparatus 1000 illustrated in FIGS. 1 and 2 will be described with reference to FIG. 3. FIG. 3 is a diagram illustrating subject pixels for determining whether the source is necessary, or not, when the enlarging process and the blending process are implemented in combination.

In the conversion of the display image into the pixel addresses by the display address converting unit 1102, the display address converting unit 1102 normally outputs a plurality of pixel addresses for the display image with respect to one pixel address for the source image. This is because a pixel data of the plural pixels is referred to for generation of one pixel in a process of executing the filter arithmetic operation in the transforming process. Further, this is because the same pixel data of the source image is referred to for the process of generating the plural pixel data for the display image in the enlarging process.

In the example of FIG. 3, it is assumed that the enlarging process is implemented on a source image 200 to generate a transformed source image 210. The source image 200 is a source image that is input to the image processing apparatus 1000. The transformed source image 210 is an image that is obtained by subjecting the source image 200 to the enlarging process as the transforming process by the transform processing unit 1003, and input to the blend processing unit 1004. A pixel block 201 are a pixel block of 3×3 pixels which cuts a partial area out of the source image 200 in which each rectangle represents one pixel. Also, a pixel block 211 is a pixel block of 7×6 pixels corresponding to the pixel block 201.

In this case, in the transforming process of the enlarging process by the transform processing unit 1003, one shaded pixel of the pixel block 201 is used at the time of processing plural pixels of 5×4 shaded pixels in the pixel block 211. The reason is because when the filter arithmetic operation of, for example, 3 taps in a horizontal direction and 2 taps in a vertical direction is implemented in the enlarging process, there is a need to refer to the adjacent pixels by the number of taps. Further, the reason is because the same pixel of the input image before enlargement is repetitively used in generation of the adjacent plural pixels after enlargement according to an enlargement factor in the enlarging process. Accordingly, in order to determine whether one shaded pixel of the pixel block 201 in the source image 200 needs to be read from the source image memory 1010, or not, there is a need to execute one-to-many overlay determination on the basis of a correspondence of the one shaded pixel with the plural pixels of the transformed source image 210, and determine whether the read is necessary, or not. That is, in the display address converting unit 1102, the overlay determination unit 1103, and the source necessity determination unit 1104, the pixel area used in generation of the pixels of the transformed source image must be identified, the overlay relationship of the identified plural pixels and another source image transformed in the blending process must be confirmed to determine whether the read is necessary, or not, taking the output position on the display image into account, and it must be determined whether the pixel needs to be finally read, or not, according to the determination results of all the plural pixels. When the determination results of all the plural pixels are indicative of unnecessity, the subject pixel of the source image does not need to be read.

Also, in the read access to the source image memory 1010, a burst access is frequently executed from the viewpoint of the efficiency of the access to the memory and the bus. In this case, in order to determine whether the read access is unnecessary on the burst access basis, or not, a process of determining whether the pixels of the number corresponding to a burst length need to be read, or not, must be executed. Referring to FIG. 3, when it is assumed that 8 continuous pixels of a pixel block 202 is a pixel block corresponding to the burst length, the above determining process is necessary for those 8 pixels.

In the conventional example of the above Patent Literature 1, only the blending process is assumed, and the superimposed portions of the source image of the lower layer are removed, the source image is divided into the divided image to calculate the divided display address, and the source address is calculated from the divided display address to read only the necessary area of the source image from the image memory. In this case, the pixels of the display address in the display image and the pixels of the source address in the source image correspond one-to-one with each other. On the contrary, when the same process is implemented in the image processing apparatus combining the transforming process and the blending process together, the pixels of the source address in the source image and the pixels of the display address in the source image that has been subjected to the transforming process which becomes the display image have one-to-many correspondence as described above. A process of determining whether one pixel of the source image needs to be read, or not, needs to be implemented for plural pixels. For that reason, there arises such a problem that computation in the determining process is increased.

For that reason, there arises such a problem that the computation of the determining process for determining whether the source is necessary, or not, increases. Also, when the pipeline processing of the pixel basis is applied to the image processing apparatus, in order to implement the image processing apparatus without deteriorating a throughput of the image processing apparatus, the determining processes of the same number as that of the plural pixels must be processed in parallel, resulting in such a problem that the circuit scale of the source unnecessity area calculating unit 1002 is increased.

Also, as the transforming process implemented in the transform processing unit 1003, in the above example, a case in which the enlarging process is executed is described. Further, when a rotating process is added, arithmetic operation for transforming the display address into the source address due to the rotating process is added whereby an increasing tendency of the circuit scale is increased. Alternatively, in order to suppress an increase in the circuit scale, when the determining processes of the same number as that of the plural pixels are not processed in parallel, but sequentially processed every pixel, the throughput of the image processing apparatus is largely deteriorated at a magnification that is an inverse number of the plural pixels.

Further, when the enlarging or shrinking process is implemented in the transform processing unit 1003, the size of the area of the plural pixels corresponding to one-to-many pixels described above is variable according to the setting of the enlargement factor or a reduction factor, and arithmetic operation for identifying the area of the plural pixels becomes complicated. With this configuration, the number of plural pixels for implementing the process of determining whether the source image needs to be read, or not becomes also variable, and the processing becomes complicated. For that reason, in order to implement the above process in the image processing apparatus that executes the pipeline processing of the pixel basis, the control becomes complicated, resulting in such a problem that the implementation is difficult. The same is applied to a case in which not only the enlarging or shrinking process, but also a process of deforming an image from a rectangle into an arbitrary shape such as a trapezoid are implemented.

Under the above circumstances, in the following embodiments, a description will be given of a configuration example of the image processing apparatus which can reduce a throughput necessary for determining whether the source image needs to be read, or not, and suppress an increase in the circuit scale and a deterioration in the processing throughput in a process combining the transforming process and the blending process together.

(First Embodiment)

Figure 4:
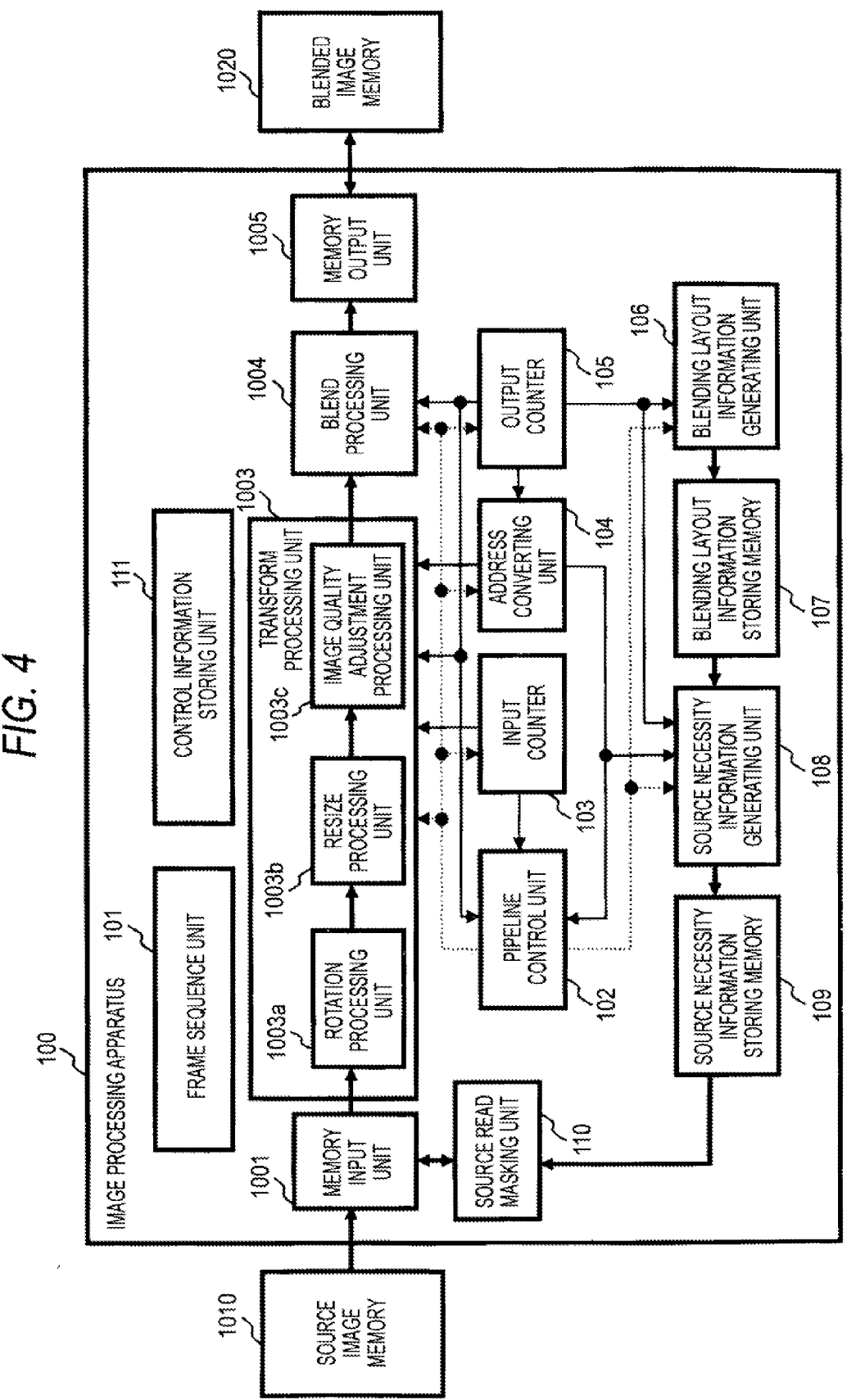
FIG. 4 is a block diagram illustrating a configuration of an image processing apparatus according to a first embodiment of the present invention.

FIG. 4 is a block diagram illustrating a configuration of an image processing apparatus 100 according to a first embodiment of the present invention. The image processing apparatus 100 according to this embodiment includes the memory input unit 1001, the transform processing unit 1003, the blend processing unit 1004, and the memory output unit 1005. The image processing apparatus 100 is connected with the source image memory 1010 and the blended image memory 1020. The source image memory 1010 is a memory that stores a source image data which is input to the image processing apparatus 100, and the blended image memory 1020 is a memory that stores the blended image data which is output from the image processing apparatus 100.

The memory input unit 1001 is a memory interface unit that reads the source image data from the source image memory 1010, and receives the source image data, and the read source image data is input to the transform processing unit 1003. On the other hand, the memory output unit 1005 is a memory interface unit that outputs the blended image data input from the blend processing unit 1004 to the blended image memory 1020.

The image processing apparatus 100 also includes a frame sequence unit 101 and a control information storing unit 111. The frame sequence unit 101 functions as a control unit that detects a start signal that is a trigger of a processing start of a frame basis from an external, executes a sequence control on frame processing of an image data over a plurality of frames in the image processing apparatus 100, and starts the respective internal processing units. The control information storing unit 111 stores control information including a variety of information and parameters necessary for the transforming process and blending process of the image data such as sizes before and after conversion, output positions, and an overlay order of the blending, and memory addresses on the source image memory 1010, of the respective source images.

The transform processing unit 1003 executes an image transforming process on the respective source images input from the memory input unit 1001 according to the sequence control by the frame sequence unit 101 and the control information held by the control information storing unit 111, and outputs the respective transformed source images to the blend processing unit 1004. The transform processing unit 1003 includes a rotation processing unit 1003a that executes a rotating process, a resize processing unit 1003b as an enlargement and shrinking processing unit shrinking processing unit which executes an enlarging or shrinking process, and an image quality adjustment processing unit 1003c that adjusts an image quality such as color substitution or luminance adjustment, or an edge emphasizing process. The pixel data of the source image input from the memory input unit 1001 are input in the order of the rotation processing unit 1003a, the resize processing unit 1003b, and the image quality adjustment processing unit 1003c, and the processing in the respective processing units are executed by the pipeline processing.

The blend processing unit 1004 executes the blending process of α-blending so as to superimpose the transformed source images input from the transform processing unit 1003 on each other or overlap translucent images on each other according to the sequence control by the frame sequence unit 101, and the control information held by the control information storing unit 111, generates the blended image data for one display image, and outputs the blended image data to the memory output unit 1005.

The respective processing units including the rotation processing unit 1003a, the resize processing unit 1003b, and the image quality adjustment processing unit 1003c in the transform processing unit 1003, and the blend processing unit 1004 are each equipped with a data buffer for absorbing timing between the adjacent processing units as the occasion demands.

The image processing apparatus 100 also includes a pipeline control unit 102, an input counter 103, an address converting unit 104, an output counter 105, a blending layout information generating unit 106, a blending layout information storing memory 107, a source necessity information generating unit 108, a source necessity information storing memory 109, and a source read masking unit 110.

The pipeline control unit 102 controls timing of the transforming process, the blending process, and a sequence of pipeline processing of the blending layout information generation and the source necessity information generation. Hence, the pipeline control unit 102 controls the timing of the transform processing unit 1003, the blend processing unit 1004, the blending layout information generating unit 106, the source necessity information generating unit 108, the input counter 103, the address converting unit 104, and the output counter 105, which are related to the pipeline processing. That is, the pipeline control unit 102 functions as a control unit that executes the timing control of the respective processing within one frame processing.

The input counter 103 is a counter of the pixel data of the respective source images input to the transform processing unit 1003, and outputs an address which is coordinates indicative of the number of lines in a vertical direction and a pixel position in a horizontal direction on the source image.

The output counter 105 is a counter of the pixel data of the transformed source image output from the transform processing unit 1003, and outputs the address which is the coordinates indicative of the number of lines in the vertical direction and the pixel position in the horizontal direction on the transformed source image.

The address converting unit 104 converts the address value of the pixel data of the transformed source image output from the output counter 105 into an address value of the pixel data on the source image required when the respective processing units of the transform processing unit 1003 generate the pixel data.

The blending layout information generating unit 106 generates blending layout information indicative of the overlay information in the blended image of the plural transformed source images output from the transform processing unit 1003 in synchronism with the blending process of the blend processing unit 1004, and writes the blending layout information in the blending layout information storing memory 107. The blending layout information storing memory 107 is a memory that stores the blending layout information from the blending layout information generating unit 106.

The source necessity information generating unit 108 generates source necessity information indicative of an area on the source image, which becomes unnecessary for overwriting through the blending process for the respective source images with reference to the blending layout information in the blending lay out information storing memory 107 in synchronism with the transforming process of the transform processing unit 1003, and writes the source necessity information in the source necessity information storing memory 109. The source necessity information storing memory 109 is a memory that stores the source necessity information from the source necessity information generating unit 108.

The source read masking unit 110 executes a read masking control for stopping the issuance of a read access request to the source unnecessity area among read access requests to the source image memory 1010 which are issued by the memory input unit 1001 with reference to the source necessity information in the source necessity information storing memory 109. Under the read masking control, when the source image data is read from the source image memory 1010, the read access to the source image data in the unnecessary area can be prevented from being implemented. The memory input unit 1001 internally provides dummy data as the read data responsive to the read access request whose issuance is stopped by the source read masking unit 110, and outputs the dummy data to the transform processing unit 1003.

Figure 5:
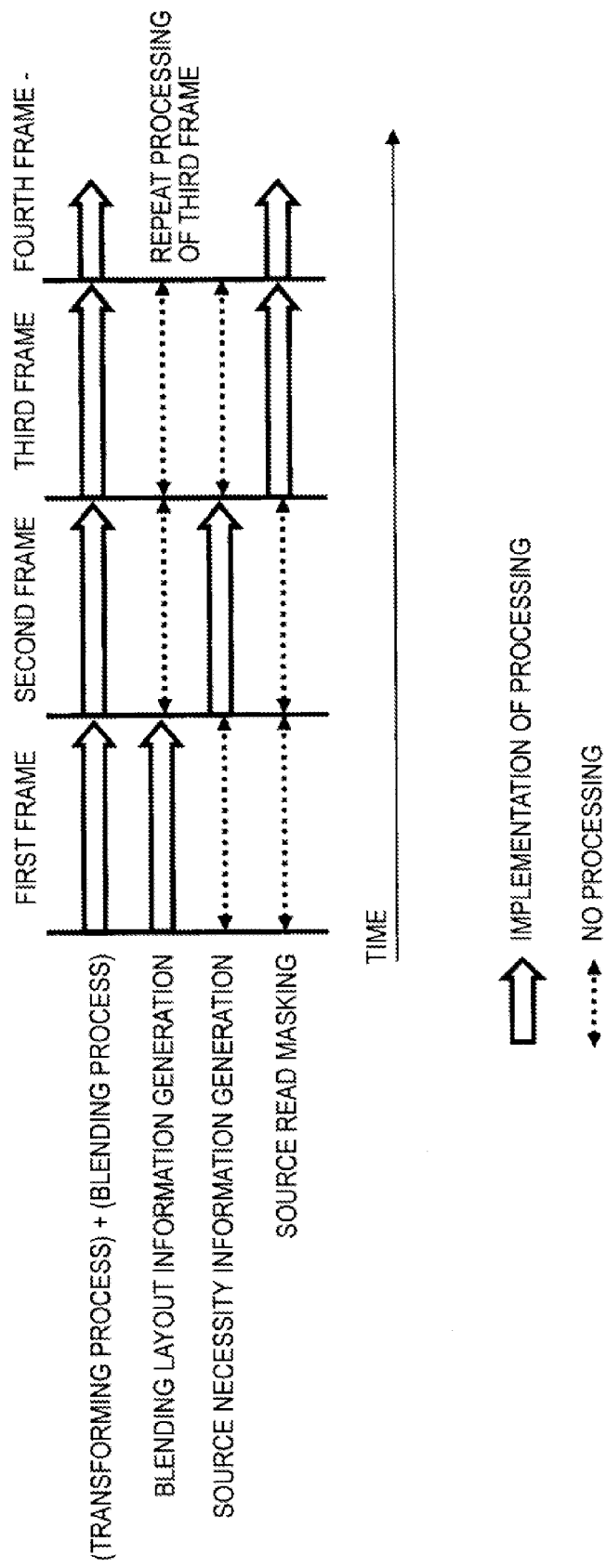
FIG. 5 is a diagram illustrating a successive-frame processing flow of image data in the image processing apparatus according to the first embodiment.

Subsequently, a processing flow in the image processing apparatus 100 of FIG. 4 will be described with reference to FIG. 5. FIG. 5 is a diagram illustrating a processing flow when the frame processing of the image data is processed by a successive frame in the image processing apparatus 100 according to the first embodiment. In this embodiment, it is assumed that the image data of a moving image having a plurality of successive frames is processed. Referring to FIG. 5, the axis of ordinate represents the respective processing implemented by the image processing apparatus 100, and the axis of abscissa represents a time axis, and indicates whether to implement the respective processing in processing periods of a second frame, a third frame, a fourth frame, . . . in the order from a first frame processing which is a new processing start.

The processing in the first frame, while the transforming process and the blending process which are original functions are executed by the transform processing unit 1003 and the blend processing unit 1004, the processing of the blending layout information generation is executed by the blending layout information generating unit 106. In the processing of the first frame, the processing of the source necessity information generation and the source read masking is not executed.

In the processing of the second frame, the transforming process and the blending process are executed as in the same manner as the processing in the first frame, and at the same time, the processing of the source necessity information generation is executed by the source necessity information generating unit 108. The processing of the blending layout information generation has been implemented in the processing of the first frame, and therefore is not executed in the processing of the second frame, and the processing of the source read masking is not also executed.

In the processing of the third frame, the transforming process and the blending process are executed as in the same manner as the processing in the first frame, and at the same time, the processing of the source read masking for executing the read masking control is executed by the source read masking unit 110. The processing of the blending layout information generation has been implemented in the processing of the first frame, and the processing of the source necessity information generation has been implemented in the processing of the second frame. Therefore, those processing is not executed in the processing of the third frame.

In the processing of the fourth frame and the subsequent frames, the same processing as the processing in the third frame is repeated, and the processing of the source read masking for masking the read access to the source image data which becomes unnecessary at the time of executing the blending process is continued together with the transforming process.

In the processing of the second frame and the subsequent frames, the control information on the transforming process and the blending process is checked at the time of starting the frame processing. If there is a change in the source necessity information from the previous frame processing time, the processing is again executed from the processing of the first frame. The change in the source necessity information includes a change in the blending layout information due to a change in the number of source images to be blended, a change in the blended output position of the transformed source image, a change in the size of the source image, a change in the size of the source image transformed by resizing, a change from the overwriting process to the α-blending process as a translucent blending process, a change in the blending layout information, or a change to a format including a transparent color of the source image, in the blending process. The change in the source necessity information also includes a change in the rotating process, and a change in the number of taps in the filtering process of the resizing and image quality adjusting process.

Figure 6:
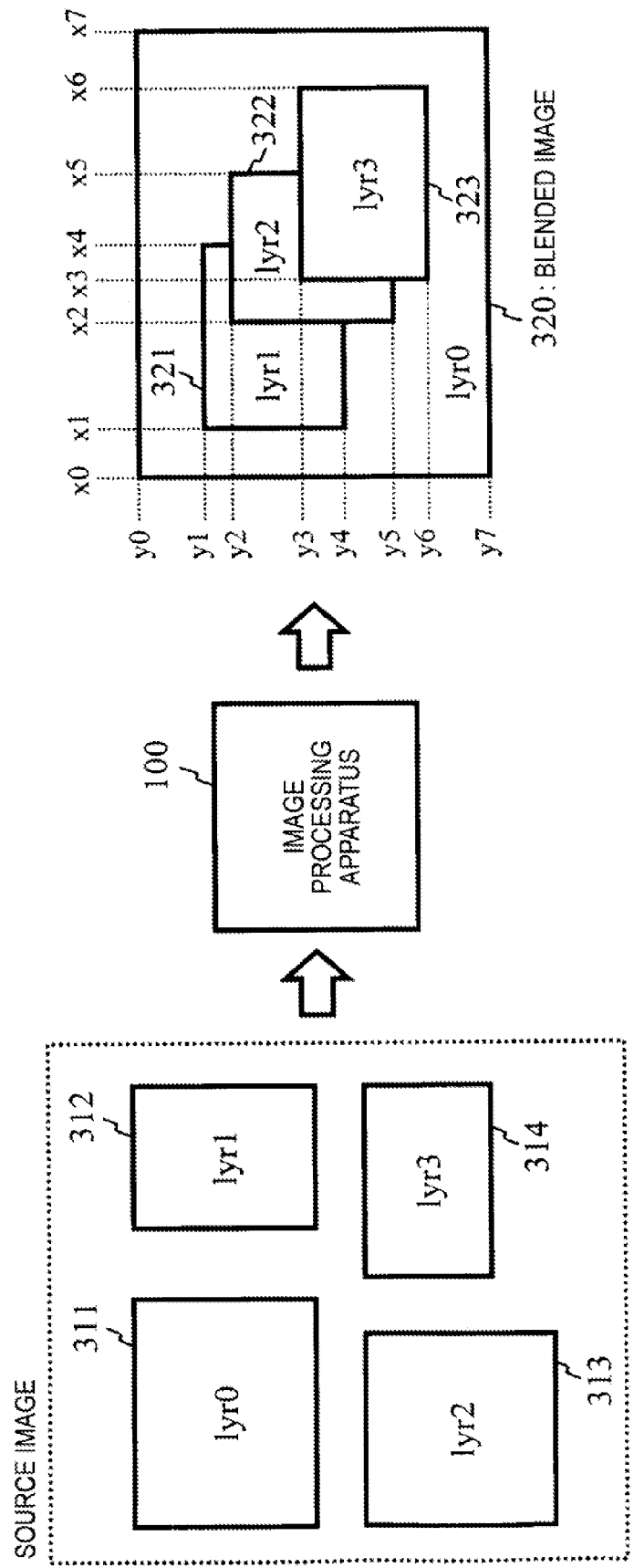
FIG. 6 is a diagram illustrating a processing example of the transforming process and the blending process in the image processing apparatus according to this embodiment.

FIG. 6 is a diagram illustrating a processing example of the transforming process and the blending process in the image processing apparatus according to this embodiment. Also, FIG. 7 is a diagram illustrating processing contents related to the respective source images in the processing example of FIG. 6. The image processing apparatus 100 receives four source images of source images lyr0 (311), lyr1 (312), lyr2 (313), and lyr3 (314) stored in the source image memory 1010. The image processing apparatus 100 executes the transforming process and the blending process of the processing contents illustrated in FIG. 7 on the respective source images, generates a blended image represented by a blended image 320, and outputs blended image data to the blended image memory 1020.

In this case, as illustrated in FIG. 6, the blending process of the source image is higher in the display priority in the order of lyr0, lyr1, lyr2, and lyr3. Also, as illustrated in FIG. 7, lyr0 is located in a lowest layer, and lyr1 and lyr2 are all overwritten with images having no transparent color. Therefore, the image data of lyr0 and lyr1 in the positions of the lower layers which are in areas superimposed on images of upper layers are unnecessary. However, because lyr3 is α-blended with the images of the lower layers, the image data of lyr2 and lyr0 in the lower layers of lyr3 is necessary.

In the blended image 320 of FIG. 6, a y-axis is taken in a vertical downward direction with an uppermost line position y0 as an origin, and an x-axis is taken in a horizontal rightward direction with a left end pixel position x0 as an origin, with respect to a frame of the blended image. In the blended image 320, the transformed source image lyr0 is equal in size to the frame of the blended image.

Figure 8:
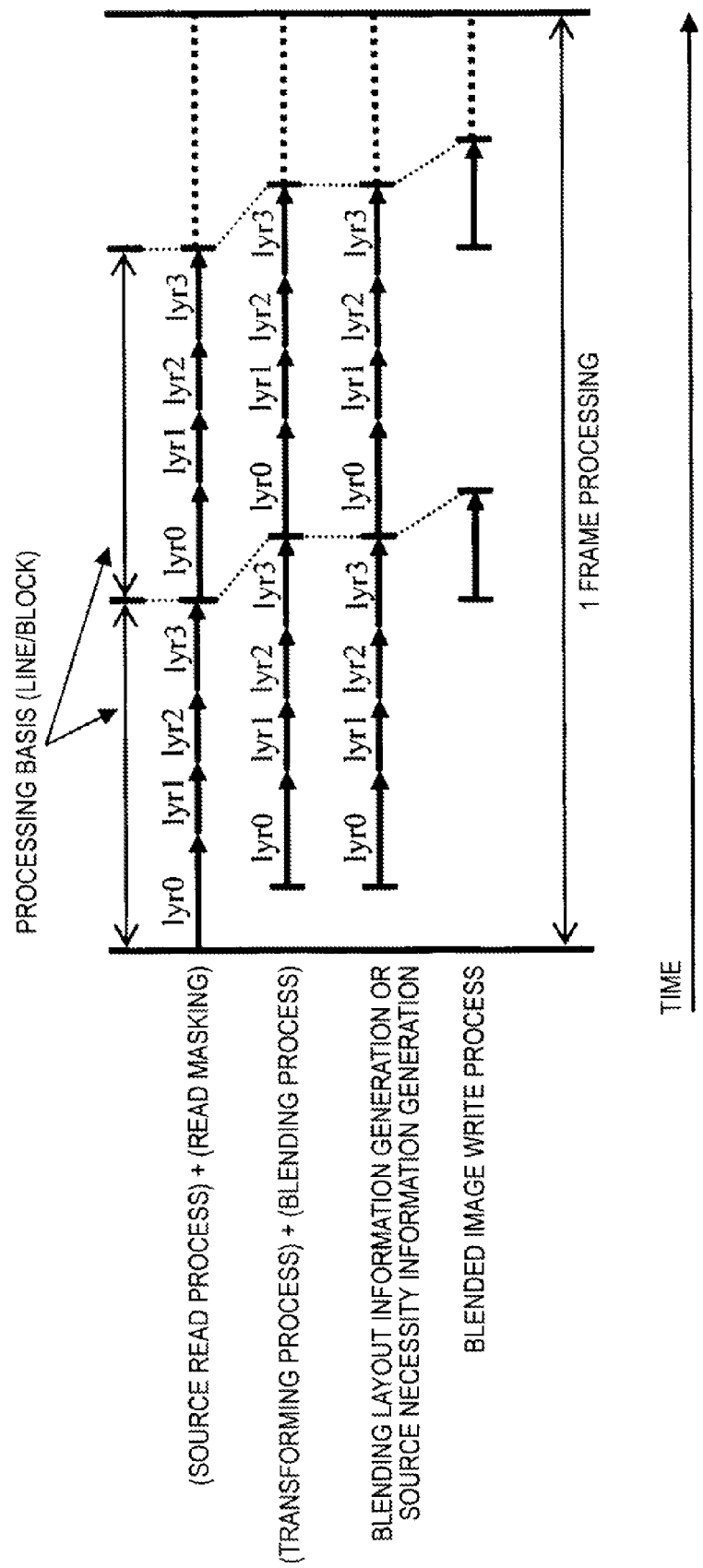
FIG. 8 is a diagram illustrating a frame processing flow of one frame of the image data in the image processing apparatus according to the first embodiment.

FIG. 8 is a diagram illustrating a processing flow at the time of executing frame processing of one frame of the image data in the image processing apparatus 100 according to the first embodiment. As the processing method of the frame, the frame is divided into a processing unit when the line basis or a pixel block basis that is a rectangular area of the plural pixels is the processing unit, and processing of the processing unit is repeated by the number of divisions. In this situation, a sequence control of the entire frame unit is executed by the frame sequence unit 101, and after the frame processing of one frame has started, the pipeline control unit 102 controls the respective processing within the frame.

For example, when the processing unit is the line basis, the processing starts from the pixel data generation of the uppermost line where the y-coordinate of the blended image 320 in FIG. 6 is 0, and the pixel data generation on one lower line is generated in order to the lowest line where the y-coordinate is y7 to execute line generation line by line downward. As the processing flow of the line generation, the processing is executed in order from the source images of the lower layers that are lower in the display priority of the blending process in the order of lyr0, lyr1, lyr2, and lyr3. The processing is executed in order from a left end pixel of the respective source images to a right end pixel in a positive direction of the x-coordinate.

In the frame processing of one frame, in the processing of the respective source images of lyr0, lyr1, lyr2, and lyr3, the pipeline processing of the pixel basis is executed in the order of the source reading process+read masking, the transforming process+the blending process, the blending layout information generation or the source necessity information generation, and the blended image reading process.

In this example, the processing of the source reading process+the read masking is processing related to the reading process and the read masking control of the source image data. That is, when the generation of the source necessity information has been completed in a previous frame processing, and the read masking is enabled, the reading process of the source image data adding the read masking control is executed. On the other hand, when the generation of the source necessity information has not been completed, the reading process of the source image data is executed without execution of the read masking control.

The transforming process+the blending process are processing for implementing the transforming process and the blending process according to the control information including parameters related to the respective processing.

In the processing of the blending layout information generation or the source necessity information generation, when any processing of the blending layout information generation and the source necessity information generation is indicated in the running frame processing as in the successive frame processing of FIG. 5, the indicated processing is executed in parallel to the transforming process+the blending process.

The blended image writing process is processing executed in parallel to the blending process of lyr3 highest in the display priority in the transforming process+the blending process, and processing for writing data generated as a final blended image data to an external memory in order.

Subsequently, a description will be given of the detailed operation of the frame processing of the respective frames in the above-mentioned successive frame processing in FIGS. 5 to 8.

First, the processing of the first frame in FIG. 5 will be described.

When the frame processing is started in the image processing apparatus 100, the frame sequence unit 101 detects a signal of the frame processing start, and starts the frame processing. The frame sequence unit 101 confirms that an inner state is first frame processing of the first frame, and initializes the blending layout information storing memory 107 and the source necessity information storing memory 109. Then, the frame sequence unit 101 accesses to an external memory not illustrated in FIG. 4, reads the control information necessary for the transforming process and the blending process, and stores the control information in the control information storing unit 111. In this example, a part or all of the control information may be written in advance by a host computer such as a CPU or a microcomputer that controls the image processing apparatus 100.

Upon completion of storage of the control information in the control information storing unit 111, the frame sequence unit 101 determines that the blending layout information generation is executed in addition to the transforming process and the blending process as the processing of the first frame. Then, the frame sequence unit 101 starts the transform processing unit 1003, the blend processing unit 1004, the blending layout information generating unit 106, and the pipeline control unit 102.

The pipeline control unit 102 executes a repetitive control of the line processing which is the processing unit and a sequence control of the line processing, and executes a timing control of the pixel pipeline processing.

The output counter 105 has a counter that holds the y-coordinate, and sets the counter to 0 at the time of starting the first line processing of y=0, and increments the counter at the time of starting the subsequent line processing to hold line No. of the line under processing. Upon starting the line processing, the pipeline control unit 102 checks whether the source line exists on a line of the blended image to be subjected to the line processing, or not, in order from the source images of the lower layers in the blending process such as the source images lyr0, lyr1, lyr2, and lyr3. If there exists the source image, the pipeline control unit 102 executes the transforming process and the blending process for generating data on the subject line of the source image. If there exists no source image, the pipeline control unit 102 skips the transforming process and the blending process of the source image, and then transits to the processing of the source image located in the upper layer. The check of the source image can be determined according to a vertical size of the transformed source image stored in the control information storing unit 111, a parameter of an offset value of the y-coordinate indicative of an output start position of the blended image, and a y-coordinate value of the subject line held by the output counter 105. In this checking process, an overlay determination on the source image located in the upper layer is not implemented.

If there exists the source image as a result of checking the source image, the pipeline control unit 102 starts the implementation of the transforming process and the blending process. In executing the transforming process and the blending process, the pipeline control unit 102 first identifies a line area in the source image necessary for the transforming process and the blending process. The identification of the line area is implemented by the address converting unit 104, and is an address transforming process from the coordinates of the blended image to the coordinates of the source image. The identifying process of the line area will be described with reference to FIG. 9.

Figure 9:
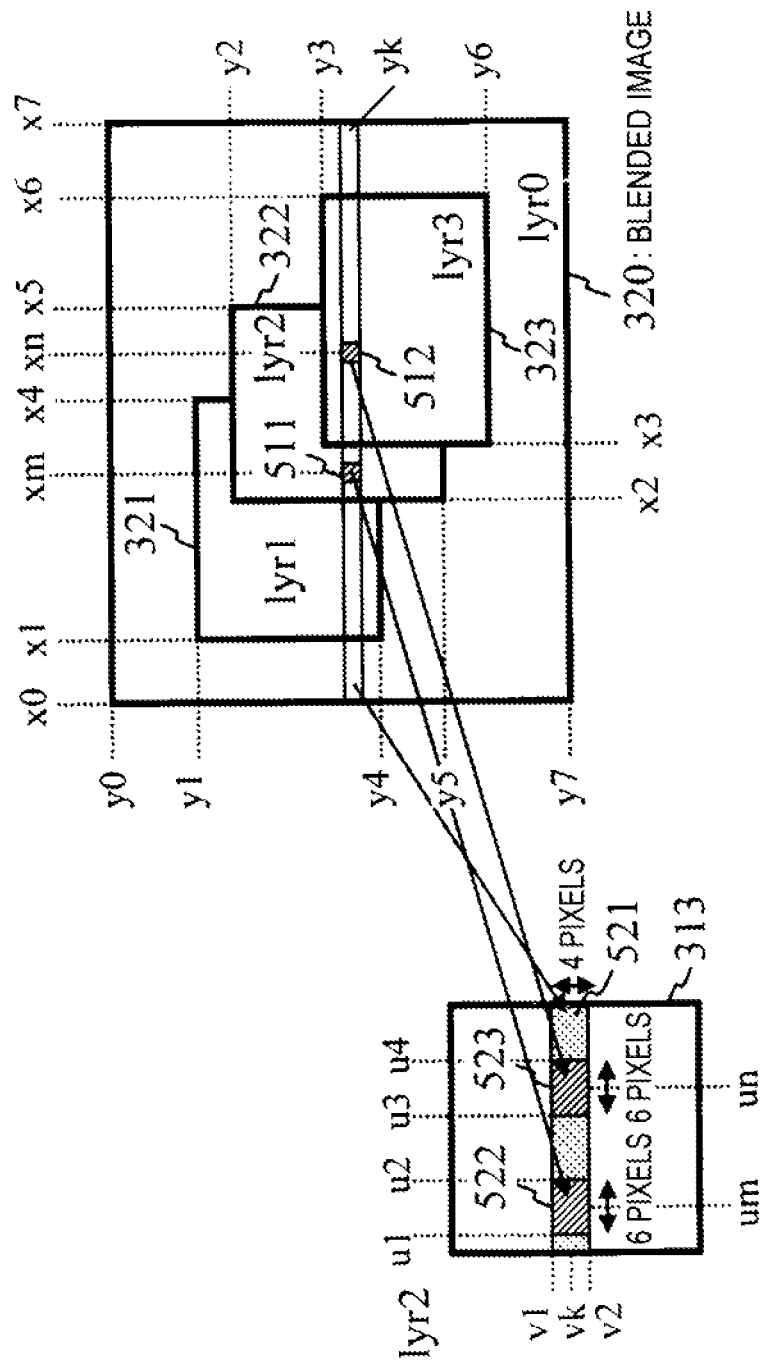
FIG. 9 is a diagram illustrating a concept of address conversion by an address converting unit according to this embodiment.

FIG. 9 is a diagram illustrating a concept of address conversion by the address converting unit 104. This example shows the address transforming process of the source image lyr2 (313) in the line processing of a coordinate y=yk (y3≦yk<y4) of the blended image 320. The address transforming process subtracts an offset value y2 indicative of the output start position of the transformed source image lyr2 (322) in the blended image 320 from yk as the y-coordinate in the transformed source image lyr2 (322), and multiplies the y-coordinate by a parameter that is an inverse number of a vertical enlargement and reduction factor to calculate a vertical coordinate vk in the source image lyr2 (313). When the filtering process of four taps is executed in the shrinking process of lyr2 (313), a pixel block in a four-line area between coordinates v1 and v2 whose center position is vk is a line area necessary for the transforming process of the source image lyr2 (313).

Upon completion of calculation of the line area necessary for the transforming process and the blending process, the pipeline control unit 102 instructs the memory input unit 1001 to read the source image data of the identified line area from the source image memory 1010. The memory input unit 1001 converts the identified line area into the address of the source image memory 1010 to sequentially execute the read access to the address by parameters of a stride indicative of a distance between the lines of the source image to be processed, an image format, and a base address of a storage start position of the source image memory 1010, and inputs the red source image data to the transform processing unit 1003. In this situation, data input to the transform processing unit 1003 is counted by the input counter 103. The counter value of the input counter 103 corresponds to a coordinate of the source image in the horizontal direction.

The transform processing unit 1003 converts the source image data input from the memory input unit 1001 in order according to the control information of the control information storing unit 111 in the respective processing units of the rotation processing unit 1003a, the resize processing unit 1003b, and the image quality adjustment processing unit 1003c. When the shrinking process is executed in input and output of the resize processing unit 1003b, one line is output by the resizing process in the vertical direction with respect to an input of plural lines. In the processing example of the source image lyr2 (313) illustrated in FIG. 9 as described above, four lines are input, and one line is output. Further, the resize processing unit 1003b changes the size of the source image in the horizontal direction.

The size change in the horizontal direction by the resize processing unit 1003b is realized by controlling the number of data input/output through the pipeline control unit 102 by comparing the counter values through the input counter 103, the output counter 105, and the address converting unit 104. The output counter 105 has a counter of the x-coordinate in the horizontal direction in addition to the counter of the y-coordinate. The x-coordinate counter counts the number of output pixels from the resize processing unit 1003b, and counts the pixels to the right end pixel of the transformed source image with the left end pixel as 0. The offset value of the x-coordinate indicative of the output start position in the blended image 320 is added to the count value of the x-coordinate to obtain the x-coordinate in the blended image 320. In the transformed source image lyr2 (322) of FIG. 9, the offset value x 2 may be added thereto.

The address converting unit 104 converts the x-coordinate counter value of the output counter 105 into a coordinate of the pixel area of the source image which is necessary for the resizing process as in the above transforming process of the y-coordinate. The address transforming process of the x-coordinate will be described with reference to FIG. 9. In the coordinate conversion of a pixel 511 of x=xm and y=yk in the transformed source image lyr2 (322), (xm−x2) obtained by subtracting x2 from xm is the counter value held by the x-coordinate counter of the output counter 105. The address converting unit 104 multiplies the counter value (xm−x2) by a parameter that is an inverse number of a horizontal enlargement and reduction factor to calculate a horizontal coordinate vk in the source image lyr2 (313). When the filtering process of six taps is executed in the shrinking process of the source image lyr2 (313), a pixel block 522 in a 6×4 pixel area between coordinates u1 and u2 whose center position is uk is a pixel area necessary for the resizing process of the pixel 511. Likewise, a pixel block 523 is a pixel area necessary for the resizing process of a pixel 512.

The pipeline control unit 102 compares a u-coordinate value of the pixel area which is calculated in the address converting unit 104 with the counter value of the input counter 103, and inputs the pixel data of the just above-obtained pixel area to the resize processing unit 1003b. In the resizing process of the pixel 511, the input counter executes data input up to the right end coordinate u2 of the pixel block 522. Then, the pipeline control unit 102 generates a right adjacent pixel of the pixel 511, and obtains the pixel area of the corresponding source image in the same manner as that described above. When the pixel area is shifted to the right side, data input is advanced up to the shifted position, and when the pixel area is identical, the data input from a previous stage is installed.

The blend processing unit 1004 blends the transformed source image data input from the transform processing unit 1003. The blend processing unit 1004 internally includes a line memory for a line width of the blended image 320, and writes the blending process results in the line memory. If the source image under processing is an image format including a transparent color, the blend processing unit 1004 determines whether the pixel to be blended is of the transparent color, or not. If the pixel is of the transparent color, the blend processing unit 1004 does not write the data in the line memory, and if the pixel is not of the transparent color, the blend processing unit 1004 overwrites the data at an address corresponding to the output position of the line memory. Alternatively, if the blending process contents is α-blending, the blend processing unit 1004 reads data corresponding to the output position of the line memory, and reads data of the source image located in the lower layer. The blend processing unit 1004 executes the blending process with the input pixel data on the basis of an α value set for the individual pixel or the entire source image, and rewrites the data at the address corresponding to the output position of the line memory. The output position is the x-coordinate of the blended image 320, and obtained by adding the x-coordinate offset value, which is the output position of the source image, to the counter value of the x-coordinate counter of the output counter 105.

Upon completion of the blending process of the source image located at the uppermost position on the line under processing, the blend processing unit 1004 outputs data on the internal line memory to the memory output unit 1005, and writes the data in the blended image memory 1020 through the memory output unit 1005.

In the processing of the first frame, the blending layout information generating unit 106 executes the processing of the blending layout information generation in parallel to the transforming process and the blending process. The blending layout information generating unit 106 executes the processing in synchronism with the pixel processing of the blend processing unit 1004 with reference to the counter values of the x-coordinate and the y-coordinate of the output counter 105.

The blending layout information generating unit 106 determines the type of the blending process of the source image under processing with reference to the image format of the source image under processing and the blending process control information which are stored in the control information storing unit 111. In this situation, the blending layout information generating unit 106 executes the process of determining whether the blending process is the overwriting process having no transparenting process, or not, whether the source image is an image including the transparent color or a stencil bit indicative of the transparenting process, and the transmission blending occurs, or not, or whether not the overwriting process but the α-blending is executed, or not. In this example, if the determination result is that the overwriting process is executed on all the pixels in the blending process, and the source image does not execute the transmission blending or the α-blending which requires data of the lower layer, the blending layout information generating unit 106 writes No. of the source image under processing in the blending layout information storing memory 107 as the blending layout information of the pixel position which executes the blending process of the blended image 320. The blending layout information storing memory 107 is initialized by No. 0 at the time of initialization.

Even if the source image in which the pixel position of the stencil bit indicative of the transparenting process, or the pixel position of a numerical value (for example, α=0) where the α-value of the α-blending does not blend the pixel data of the lower layer is fixed in the successive frame processing is the source image that executes the transmission blending or the α-blending, the blending layout information generating unit 106 may determine the stencil bit or the α-value for each pixel, and write No. of the source image under processing at the pixel position where the overwriting process is executed in the blending layout information storing memory 107.

Figure 10:
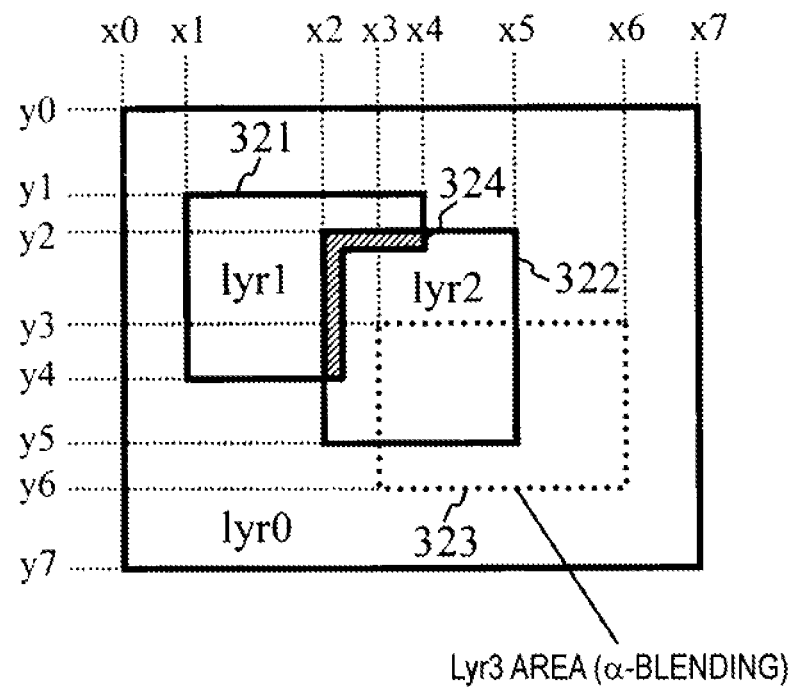
FIG. 10 is a diagram illustrating a concept of blending layout information according to this embodiment.

The blending layout information generating unit 106 repeats the above-mentioned writing process of No. of the source image in order from the least significant source image lowest in the display priority to the most significant source image, and executes the writing process for one frame, to thereby complete the blending layout information of the blended image 320. FIG. 10 is a conceptual diagram of the blending layout information stored in the blending layout information storing memory 107.

In this example, if a plurality of pixel areas is required in the filtering process of the image quality adjusting process after the resizing process in the transforming process of the source image of the lower layer, there is a need that the source No. is not overwritten in the necessary pixel area from a frame boundary of the source image of the upper layer so that the plurality of pixel areas is not overwritten and erased by writing No. of the source image of the upper layer in the generation of the blending layout information. For example, if there is the filtering process of the image quality adjusting process in the generation of the transformed source image lyr1 (321), a shaded pixel area 324 in FIG. 10 is overwritten by the transformed source image lyr2 (322). However, because the pixel area 324 is necessary for the generating process of boundary pixels between the transformed source image lyr1 (321) and the transformed source image lyr2 (322), No. of lyr2 is not overwritten in the pixel area 324 when the blending layout information is generated.

In an area of the transformed source image lyr3 (323), the image data of the lower layer is necessary because the α-blending process is executed as the blending process, and No. of lyr3 is not overwritten in the blending layout information. The blending lay/out information is thus generated so that No. of the source image located in the lowest position can be expressed in the source image necessary in each pixel area. For example, the blending layout information on the pixel area of the x-coordinates x3 to x5 and the y-coordinates y3 to y5 is No. 5 indicative of lyr2, and in this pixel area requires the source image lyr2 and lyr3 located in the upper layer.

As described above, the blending layout information generating unit 106 repeats, as the generating process of the blending layout information, the process of overwriting No. of the source image of the upper layer when the source image in the position of the lower layer is unnecessary in the blending process in order from the least significant source image lowest in the display priority to the most significant source image, on the line basis which is the processing unit, in one frame processing period, and executes the line basis processing for one frame. Because the blending layout information is thus generated to obtain information indicative of the overlay state of the pixels for one frame, there is no need to determine the overlay for each pixel, and the overlay determining process between the source images in the serial processing of the pixel unit as in the conventional art can be reduced.

Figures 11, 12:
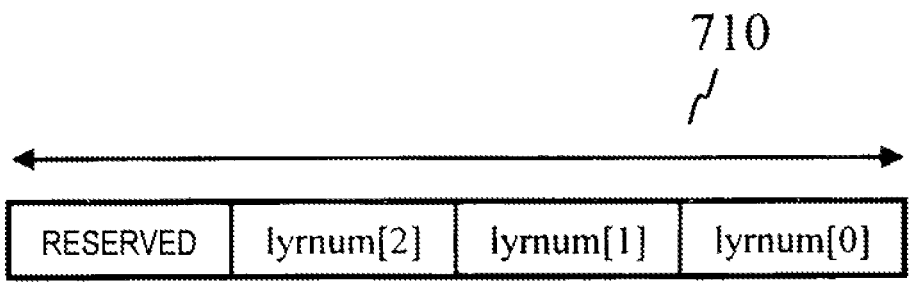
FIG. 11 is a diagram illustrating an example of a bit format of the blending layout information.
FIG. 12 is a diagram illustrating correspondences of the blending layout information and block sizes.

In order to reduce the memory capacity of the blending layout information storing memory 107, the blending layout information is divided into blocks in the blending layout information generating unit 106. The amount of information is reduced by allocating the blending layout information on plural pixel block bases. FIG. 11 is a diagram illustrating an example of a bit format of the blending layout information, and FIG. 12 is a diagram illustrating correspondences of the blending layout information and block sizes.

A blending layout information bit format 710 illustrated in FIG. 11 is a bit format of the blending layout information per one block, and one data is configured by four bits. The maximum number of input source images to the image processing apparatus 100 is eight images, No. of the source image is represented by three bits, and identification number information on the source image is used as the blending layout information. In this case, the most significant bit is an unused bit.

A blending layout information block size correspondence table 720 illustrated in FIG. 12 shows correspondences of a horizontal size or a vertical size of the pixel block of the blending layout information to a horizontal size or a vertical size of the blended image in a table. In this table, "Level" corresponds to No. for classifying the block size. The size upper limit of the blending layout information for one frame is held constant by making the block size variable according to the size of the blended image. For example, when the size of the blended image is horizontal 720 pixels (W)×vertical 480 pixels (H), the horizontal size is Level 4, the vertical size is Level 3, and the block size is 16 (W)×8 (H) pixel block. In this correspondence table, the maximum number of blocks in each of the horizontal direction and the vertical direction is 64 blocks, and the maximum size of blending layout information is 64×64×4 bits which are 2 Kbytes.

The determination of the block size of the blending layout information is not limited to the blending layout information block size correspondence table 720, but the block size may be so changed as to change the upper limit of the maximum size of the blending layout information, or may be fixed not depending on the size of the blended image.

The processing operation of the first frame in FIG. 5 is described above.

Subsequently, the processing of the second frame in FIG. 5 will be described.

After the processing of the first frame has been completed, when the frame processing newly starts in the image processing apparatus 100, the frame sequence unit 101 detects a signal of the frame processing start, and starts the frame processing.

The frame sequence unit 101 confirms that the inner state is the processing of the second frame, and as in the processing of the first frame, accesses to the external memory, reads the control information necessary for the transforming process and the blending process, and stores the control information in the control information storing unit 111.

In this situation, the frame sequence unit 101 compares the read control information with the control information at the time of the previous frame processing, and evaluates whether there is a difference in the control information causing the blending layout information generated at the time of the previous frame processing to be changed, or not. If the frame sequence unit 101 detects the difference causing the blending layout information to be changed in the control information, the frame sequence unit 101 determines that the processing of the first frame is executed. Then, after the frame sequence unit 101 has initialized the blending layout information storing memory 107, the frame sequence unit 101 starts the processing of the blending layout information generation in addition to the transforming process and the blending process. On the other hand, if the frame sequence unit 101 detects no difference, the frame sequence unit 101 determines that the source necessity information generation is executed in addition to the transforming process and the blending process as the processing of the second frame, and starts the transform processing unit 1003, the blend processing unit 1004, the source necessity information generating unit 108, and the pipeline control unit 102.

In the detection of the difference in the control information causing the blending layout information generated at the time of the previous frame processing to be changed, the processing of the difference detection by the frame sequence unit 101 may be simplified by additionally providing control information indicative of whether there is a change in the blending layout information, or not, and setting the control information by a host computer.

The operation of the transforming process and the blending process by the transform processing unit 1003, the blend processing unit 1004, and the pipeline control unit 102 is identical with the operation described in the processing of the first frame.

In the processing of the second frame, the source necessity information generating unit 108 executes the processing of the source necessity information generation in parallel to the transforming process and the blending process. The source necessity information generating unit 108 executes the processing in synchronism with the pixel processing of the transform processing unit 1003 with reference to the counter values of the x-coordinate and the y-coordinate of the output counter 105, address converted values of a u-coordinate and a v-coordinate output by the address converting unit 104, and the blending layout information of the blending layout information storing memory 107.

The source necessity information generating unit 108 reads the blending layout information corresponding to the pixel position of the blended information indicated by the counter values of the x-coordinate and the y-coordinate in the output counter 105 from the blending layout information storing memory 107, and compares the source processing No. of the read blending layout information with the source image No. in processing. The source necessity information generating unit 108 determines whether the transformed pixel data of the source image in processing is necessary for generation of the blended image 320, or not, on the basis of the comparison of the image No. If the source image No. in processing is smaller than the source image No. of the blending layout information, the transformed pixel data is unnecessary, and if the source image No. in processing is equal to or larger than the source image No. of the blending layout information, the transformed pixel data is necessary. If the determination result of necessity is obtained in the necessity determination, because the pixel data of the pixel area of the source image corresponding to the output pixel calculated by the address converting unit 104 is necessary, the source necessity information generating unit 108 writes a flag indicative of necessity in the source necessity information storing memory 109 as the source necessity information on each pixel in the pixel area. In the case of the pixel 511 of the transformed source image lyr2 (322) illustrated in FIG. 9, the source necessity information generating unit 108 writes the flag in the source necessity information of the corresponding pixel block 522 of the source image lyr2 (313).

On the other hand, if the determination result of unnecessity is obtained in the necessity determination, the source necessity information generating unit 108 does not write the flag in the source necessity information storing memory 109. In this example, the source necessity information is data of 1 bit, 0 represents source unnecessity, 1 represents source necessity, and the source necessity information generating unit 108 writes 1 at the time of writing the flag. The source necessity information storing memory 109 is initialized by 0.

Figures 13, 14:
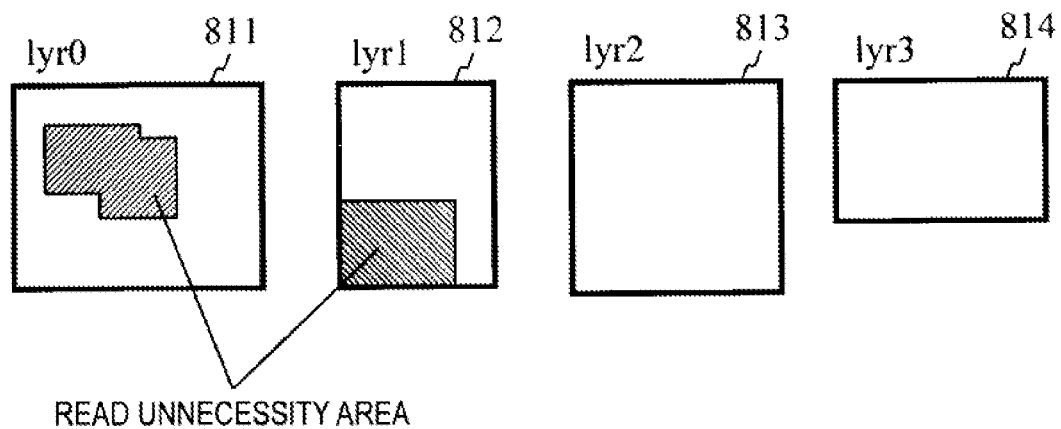
FIG. 13 is a diagram illustrating a concept of source necessity information according to this embodiment.
FIG. 14 is a diagram illustrating correspondences of the source necessity information and the block sizes.

The source necessity information generating unit 108 repeats the above-mentioned writing process of the flag indicative of whether the source image is necessary, or not, in order from the source image of the lowermost layer lowest in the display priority to the source image of the uppermost layer, and executes the writing process for one frame, to thereby complete the source necessity information of the source images lyr0 to lyr3. FIG. 13 is a conceptual diagram of the source necessity information stored in the source necessity information storing memory 109. Referring to FIG. 13, shaded parts of source necessity information 811 of the source image lyr0 and source necessity information 812 of the source image lyr1 are source unnecessity areas. All of source necessity information 813 and 814 of the source images lyr2 and lyr3 are source necessity areas.

In order to reduce the memory capacity of the source necessity information storing memory 109, the source necessity information generating unit 108 divides the source necessity information into blocks. The source necessity information generating unit 108 reduces the amount of information by allocating the source necessity information on plural pixel block bases. FIG. 14 is a diagram illustrating correspondences of the source necessity information and block sizes.

A source necessity information block size correspondence table 920 illustrated in FIG. 14 shows correspondences of a horizontal size or a vertical size of the pixel block of the source necessity information to a horizontal size or a vertical size of the source image in a table. In this table, "Level" corresponds to No. for classifying the block size. The size upper limit of the source necessity information of the source image is held constant by making the block size variable according to the size of the blended image. For example, when the size of the source image is horizontal 360 pixels (W)×vertical 240 pixels (H), the horizontal size is Level 3, the vertical size is Level 2, and the block size is 8 (W)×4 (H) pixel block. In this correspondence table, the maximum number of blocks in each of the horizontal direction and the vertical direction is 64 blocks, and the maximum size of the source necessity information is 64×64×1 bits which are 512 bytes. When it is assumed that the maximum number of inputs of the source image is 8 images, the maximum size of the entire source necessity information is 512×8 which is 4 Kbytes.

The determination of the block size of the source necessity information is not limited to the source necessity information block size correspondence table 920, but the block size may be so changed as to change the upper limit of the maximum size of the source necessity information, or may be fixed not depending on the size of the source image.

The processing operation of the second frame in FIG. 5 is described above.

Subsequently, the processing of the third frame in FIG. 5 will be described.

After the processing of the second frame has been completed, when the frame processing newly starts in the image processing apparatus 100, the frame sequence unit 101 detects a signal of the frame processing start, and starts the frame processing.

The frame sequence unit 101 confirms that the inner state is the processing of the third frame, and as in the processing of the first frame, accesses to the external memory, reads the control information necessary for the transforming process and the blending process, and stores the control information in the control information storing unit 111.

In this situation, in the same manner as that in the processing of the second frame, the frame sequence unit 101 compares the read control information with the control information at the time of the previous frame processing, and evaluates whether there is a difference in the control information causing the source necessity information generated at the time of the previous frame processing to be changed, or not. If the frame sequence unit 101 detects the difference causing the blending layout information to be changed in the control information, the frame sequence unit 101 determines that the processing of the first frame is executed. Then, after the frame sequence unit 101 has initialized the source necessity information storing memory 107 and the source necessity information storing memory 109, the frame sequence unit 101 starts the processing of the blending layout information generation in addition to the transforming process and the blending process. On the other hand, if the frame sequence unit 101 detects no difference, the frame sequence unit 101 determines that the read masking control is executed in addition to the transforming process and the blending process as the processing of the third frame, and starts the transform processing unit 1003, the blend processing unit 1004, the source read masking unit 110, and the pipeline control unit 102.

In the detection of the difference in the control information causing the source necessity information generated at the time of the previous frame processing to be changed, the processing of the difference detection by the frame sequence unit 101 may be simplified by additionally providing control information indicative of whether there is a change in the source necessity information, or not, and setting the control information by a host computer.

The operation of the transforming process and the blending process by the transform processing unit 1003, the blend processing unit 1004, and the pipeline control unit 102 is identical with the operation described in the processing of the first frame.

In the processing of the third frame, the source read masking unit 110 executes the processing of the read masking control when the frame sequence unit 101 reads the source image data from the source image memory 1010 in the transforming process and the blending process. The source read masking unit 110 confirms the source necessity information of the pixel area from the source necessity information storing memory 109 with reference to the coordinates of the pixel area of the source image read-accessed by the memory input unit 1001. In this example, in the case of the unnecessary area of the source image, the source read masking unit 110 notifies the memory input unit 1001 to suppress the issuance of the read access. The memory input unit 1001 stops the issuance of the read access whose suppression is notified of by the source read masking unit 110, and prevents the read access of the unnecessary source image data to the source image memory 1010. As the image data corresponding to the read access whose issuance stops, the memory input unit 1001 internally provides a dummy data, and outputs the dummy data to the transform processing unit 1003 instead of the original image data.

The processing operation of the third frame in FIG. 5 is described above. The frame processing subsequent to the fourth frame is identical with the processing of the third frame.

As described above, in this embodiment, when the image data of the plural frames is processed, the generating process of the blending layout information, the generating process of the source necessity information, and the source read masking process that executes the read masking control are divided in a plurality of frame processing periods, and executed in parallel to the processing of the transforming process and the blending process. As a result, the process combining the transforming process and the blending process of the image together can be executed by reducing the throughput necessary for generation of the source necessity information used for the read masking control of the source image data, without causing an increase in the circuit scale and a reduction in the processing throughput. Also, the read access to the image memory of the unnecessary source image data overwritten by the source image of the upper layer is suppressed so that data traffic between the image processing apparatus and the image memory can be reduced. Therefore, a memory bandwidth necessary for reading data from the source image memory can be reduced.

Also, in the image processing apparatus described with reference to FIGS. 1 to 3, the overlay determining process is sequentially executed for each of subject pixels of the source image. On the contrary, in this embodiment, the source necessity information for one frame of the source image is obtained for one frame period. As a result, the throughput of the overlay determination of the transformed source image necessary for calculation of the source necessity information can be reduced. For example, in the example of the transforming process of FIG. 3, the overlay determination is necessary for calculation of the source necessity information on one subject pixel of the source image. In the shaded part of the pixel block 211 of the transformed source image, there is a need to execute the overlay determining process of the pixels superimposed between the pixels of the source image through the serial processing for each pixel in the image processing apparatus described with reference to FIGS. 1 to 3. On the contrary, in this embodiment, with execution of the generating process of the blending layout information, the same determination results are obtained by one processing of executing the overwriting process determination and the overwriting of the source image No. in the blending process. Therefore, the overlay determining process of one-to-many pixels is unnecessary.

Also, the image processing apparatus described with reference to FIGS. 1 to 3, in order to maintain the processing throughput of the image processing apparatus, the address transforming process from one subject pixel of the source image to the pixel area of the transformed source image requiring the overlay determination, and the overlay determining process of the plural pixels in the pixel area must be executed in parallel, resulting in an increase in the circuit scale. On the contrary, in this embodiment, the overlay determining process of the plural pixels may not be executed in parallel for the purpose of maintaining the processing throughput of the image processing apparatus, and the repetitive process of the overlay determining process of one pixel can be executed. As a result, an increase in the circuit scale can be suppressed.

Further, the generating process of the blending layout information and the generating process of the source necessity information are divided in different frame processing periods, and the blending layout information for one frame is obtained in one frame period. As a result, the throughput of the overlay determining process can be reduced. This is because the overlay determining process between the source images corresponding to the dividing process of the display image as in the conventional example can be reduced by generating the blending layout information for one frame by overwriting the output position of the blended image in order from the source image of the lowermost layer.

Also, the generating process of the blending layout information and the source necessity information is executed in parallel to the transforming process and the blending process, and executed in synchronism with input/output control of the pixel data by the input counter and the output counter in the transforming process. As a result, the generating process of the blending layout information and the source necessity information can be incorporated in the same manner as that of the control of the pipeline processing of the transforming process and the blending process. As a result, the generating process of the blending layout information and the source necessity information can be easily implemented without causing a complicated control.

In this embodiment, the transform processing unit 1003 is configured by the rotation processing unit 1003a, the resize processing unit 1003b, and the image quality adjustment processing unit 1003c. However, the transform processing unit is not limited to this configuration.

In this embodiment, in the operation of the image processing apparatus 100, the operation of repeating the processing on the line basis is described assuming that the processing unit is the line basis. However, the processing unit is not limited to the line basis, but may be the processing unit such as the pixel block basis.

In this embodiment, as the processing flow of the image processing apparatus 100, the generating process of the blending layout information is executed in the first frame, and the generating process of the source necessity information is executed in the second frame. However, the generating process is not limited to the processing in the two frame periods of the first frame and the second frame. For example, the generating process of the blending layout information and the source necessity information may be executed in frame periods of three or more frame periods.

(Second Embodiment)

Figure 15:
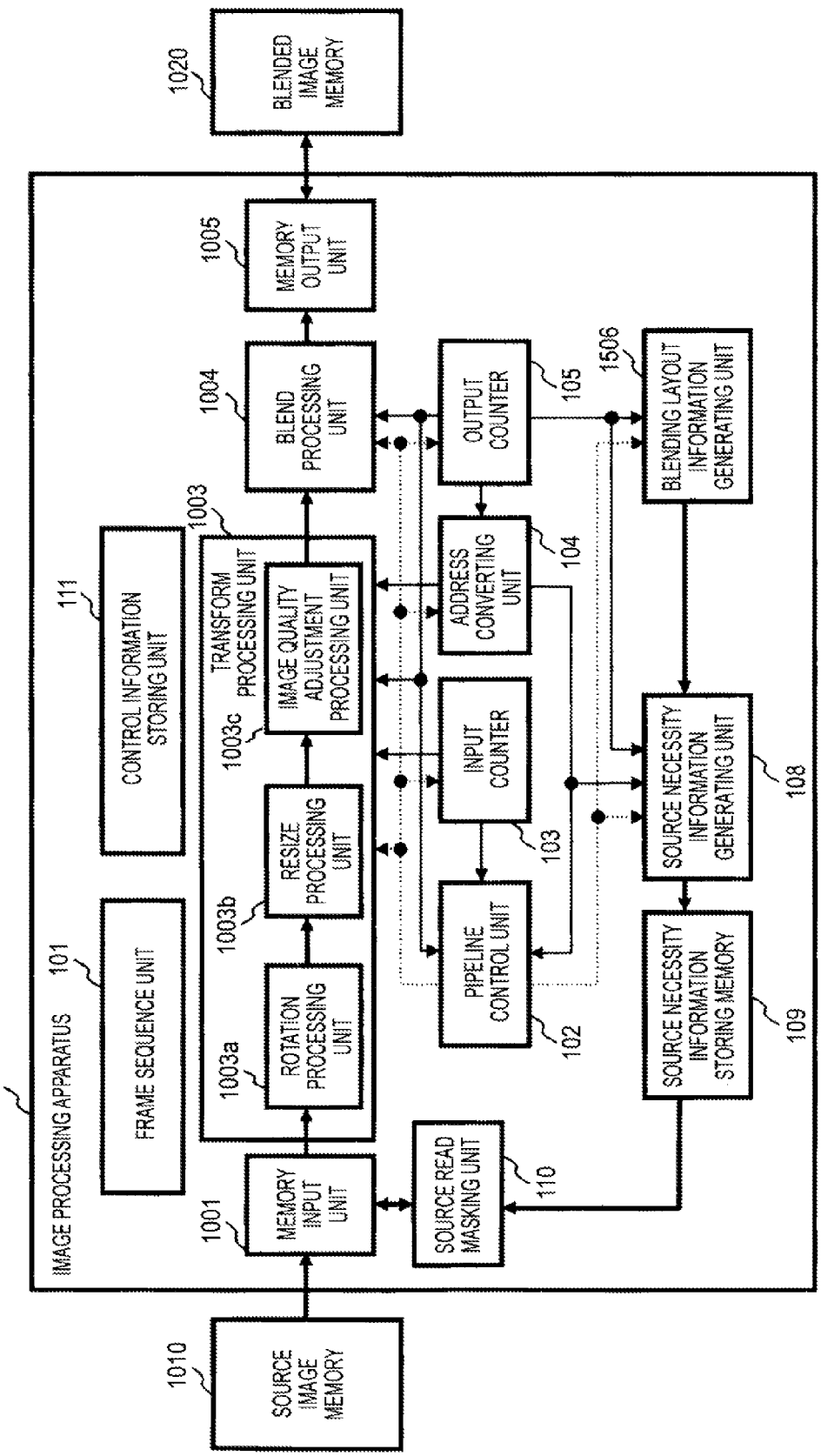
FIG. 15 is a block diagram illustrating a configuration of an image processing apparatus according to a second embodiment of the present invention.

FIG. 15 is a block diagram illustrating a configuration of an image processing apparatus 1500 according to a second embodiment of the present invention. Referring to FIG. 15, the same constituent elements as those in the first embodiment of FIG. 4 are denoted by identical symbols, and their description will be omitted.

The image processing apparatus 1500 according to the second embodiment is different from the configuration of the image processing apparatus 100 according to the first embodiment in the operation of a blending layout information generating unit 1506, and no provision of the blending layout information storing memory 107.

Figure 16:
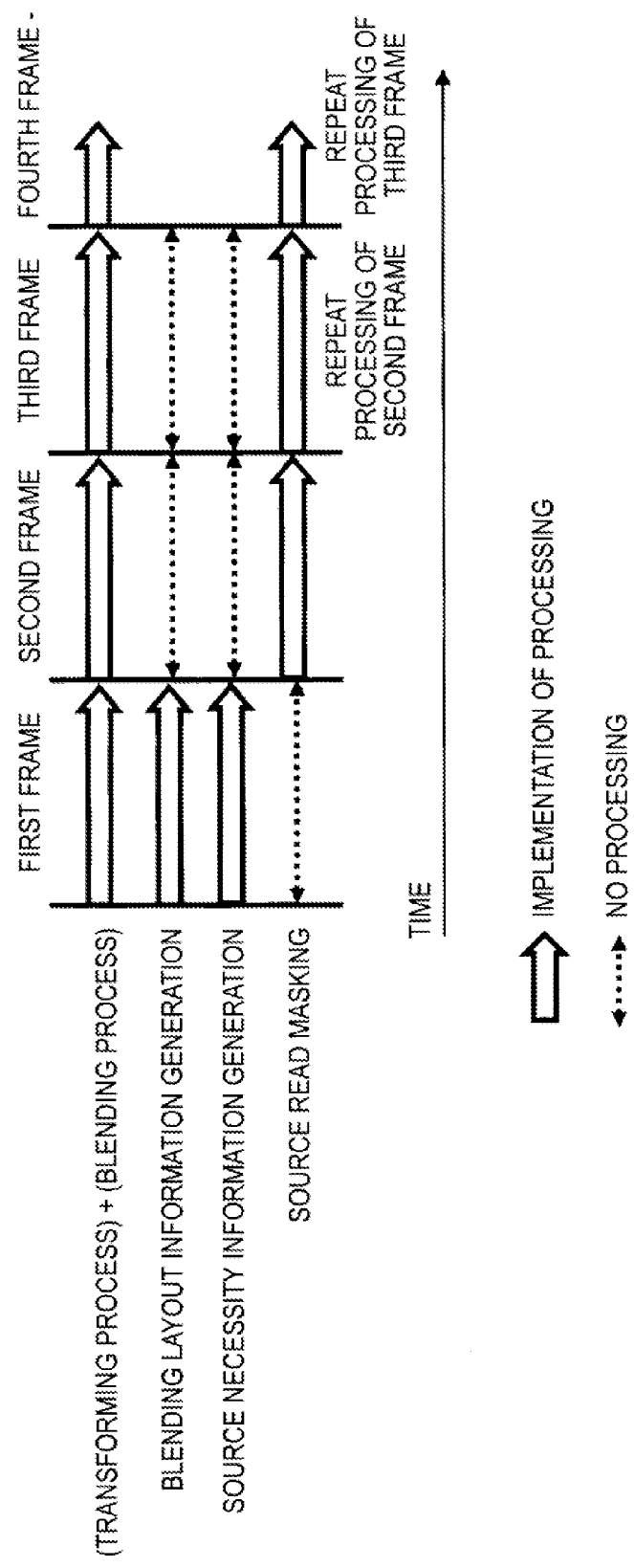
FIG. 16 is a diagram illustrating a successive-frame processing flow of image data in the image processing apparatus according to the second embodiment.

FIG. 16 is a diagram illustrating a processing flow when the frame processing of the image data is executed in a successive frame in the image processing apparatus 1500 according to the second embodiment. This processing flow is different from the processing flow according to the first embodiment in FIG. 5 in that the blending layout information generation and the source necessity information generation are executed together in parallel to the transforming process and the blending process in the processing of the first frame, and the read masking control of the source image data is executed by the aid of the source necessity information generated in the processing of the first frame in the frame processing of the second and subsequent frames.

In this case, the blending layout information generating unit 1506 in the image processing apparatus 1500 does not generate the blending layout information over one frame period, the overlay determining process of the plural source images is implemented in addition to the processing of the blending layout information generating unit 106 described in the first embodiment, at the time of the serial processing for each pixel in the first frame. That is, the overlay determination of whether the overlay occurs, or not, is implemented on the entire transformed source image that is the upper layer in addition to the determining process of whether the transmission blending occurs, or not, and whether the α-blending or the overwriting process is executed, for the source image in processing, with respect to the subject pixels of the blended image. In this example, when the overlay occurs, the determining process of whether the transmission blending occurs, or not, and whether the α-blending or the overwriting process is executed is executed. In this way, the processing including the overlay determination on the transformed source image that is the upper layer is executed, and the same blending layout information as that in the first embodiment is generated and output to the source necessity information generating unit 108.

The source necessity information generating unit 108 determines whether the source image is necessary, or not, on the basis of the blending layout information, and writes the source necessity information indicated by a flag representing the determination results in the source necessity information storing memory 109 in the same frame processing as that of the generation of the blending layout information.

In the second embodiment, the overlay determining process that can be reduced in the first embodiment is necessary. However, the read masking control of the source image is implemented from the processing of the third frame whereas in the second embodiment, the read masking control is enabled from the processing of the second frame in the successive frame processing. In this case, the overlay determining process is executed in order to implement the processing of the blending layout information generation and the source necessity information generation at once in the first frame. However, the generating process of the source necessity information and the source read masking process that executes the read masking control are divided in a plurality of frame processing periods with the result that the throughput necessary for generation of the source necessity information used for the read masking control of the source image data can be reduced. Hence, the read access to the unnecessary source image data is suppressed without causing an increase in the circuit scale and a reduction in the processing throughput, and the memory bandwidth necessary in reading from the image memory can be reduced. The other advantages are identical with the advantages described in the first embodiment.

(Third Embodiment)

Figure 17:
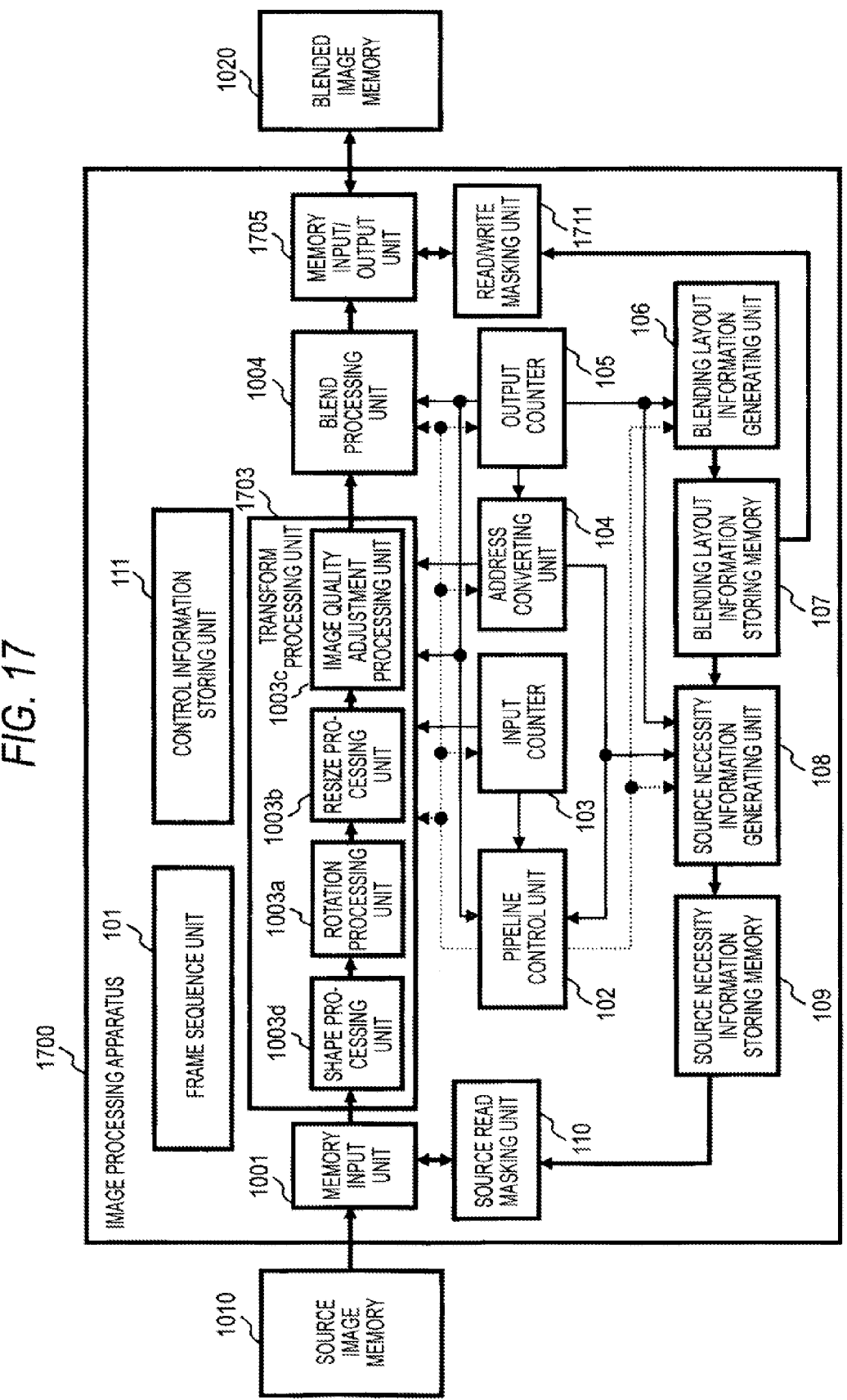
FIG. 17 is a block diagram illustrating a configuration of an image processing apparatus according to a third embodiment of the present invention.
Figure 18:
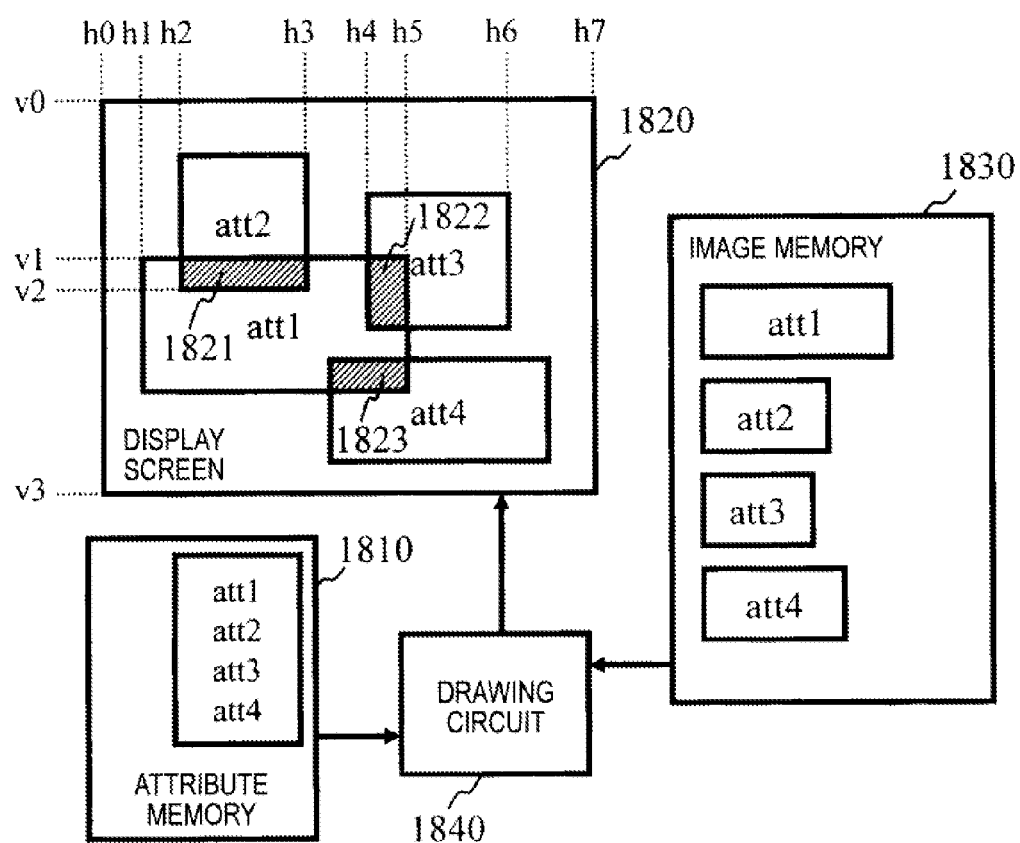
FIG. 18 is a block diagram illustrating a configuration of an image processing apparatus in a conventional example.
Figure 19:
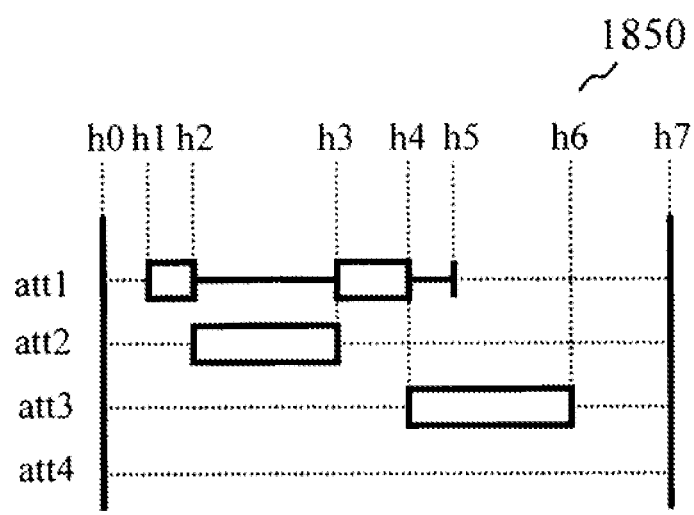
FIG. 19 is a diagram illustrating an image dividing process between v1 and v2 of a display screen in FIG. 18.

FIG. 17 is a block diagram illustrating a configuration of an image processing apparatus 1700 according to a third embodiment of the present invention. Referring to FIG. 17, the same constituent elements as those in the first embodiment of FIG. 4 are denoted by identical symbols, and their description will be omitted.

The image processing apparatus 1700 according to the third embodiment includes a shape processing unit 1003d in a transform processing unit 1703, which can arbitrarily deform a shape of the source image. Also, an output stage of the blend processing unit 1004 is equipped with a memory input/output unit 1705 that is a memory interface unit which writes or reads the blended image data with respect to the blended image memory 1020, and inputs and outputs the blended image data. Further, the image processing apparatus 1700 includes a read/write masking unit 1711 that executes a read masking control or a write masking control on the blended image memory 1020 with reference to the blending layout information in the blending layout information storing memory 107. The read/write masking unit 1711 stops the issuance of a read access request or a write access request to an unnecessary area in the read access request or the write access request to the blended image memory 1020, which is issued by the memory input/output unit 1705, to execute a masking control process on the memory.

The shape processing unit 1003d in the transform processing unit 1703 processes shape data different for each source image, and deforms the source image into a shape generated by the shape data processing. In this example, the source image stored in the source image memory 1010 is also called "texture image". The texture image is used in image processing of so-called computer graphics.

It is assumed that the shape processing unit 1003d deals with, for example, plural pieces of shape data configured by vertex information of a triangle. In this case, there is a need to read portions configuring the triangle in the texture image stored in the source image memory 1010. The shape processing unit 1003d deforms the texture image read in conformity with the generated triangle. Because the triangle is processed, the processing unit is not the line or block basis unlike the first embodiment, and processing for each triangle is excellent from the viewpoint of the control or the processing efficiency. However, when the processing is executed for each triangle, the blend processing unit 1004 needs to process the triangle of an arbitrary shape, and cannot execute the processing while closing a given dedicated buffer within the blend processing unit 1004. For that reason, the blend processing unit 1004 executes read and write with respect to the blended image memory 1020 for each blending process.

Accordingly, the blend processing unit 1004 may execute not only the read masking control by the source read masking unit 110 using the source necessity information stored in the source necessity information storing memory 109, but also the read masking control or the write masking control by the read/write masking unit 1711 using the blending layout information in the blending layout information storing memory 107. In this case, the blend processing unit 1004 executes not only the read masking of the source image data input to the transform processing unit 1703, but also the read masking or the write masking of the blended image data input or output with respect to the blend processing unit 1004. This blending manner is basically unnecessary in the first embodiment assuming that the shape of the input image data is fixed to a rectangle because the blending manner can be processed within the blend processing unit 1004, but may be applied without any problem.

It is conceivable that the blending layout information generating unit 106 generates the blending layout information under direct control from the shape processing unit 1003d grasping the triangular shape. In this case, the blending layout information generating unit 106 calculates information on a position corresponding to the blended image memory 1020 according to the shape, that is, the vertex information. Since those processing is normally executed by a graphics engine, a configuration close to that of the graphics engine may be applied without any problem. However, if a large number of triangles are provided, the amount of information to be written is also increased, and the blending layout information storing memory 107 is upsized. To cope with this, a method of processing information for not each pixel but each block having information on a plurality of pixels as described in the first embodiment, or a method of writing identification number of the triangle only when only a frontmost surface is occupied by a specific triangle is applied. In particular, the latter does not depend on the number of triangles, and therefore is advantageous in an application dealing with graphics.

With the above configuration, the image processing apparatus 1700 can realize the image processing apparatus that executes rendering on a triangle basis, and can be applied to, for example, the graphics engine. The image processing apparatus 1700 may deal with a polygonal shape larger than the triangle.

As the number of triangles which are the processing units is increased more, not only the blending layout information but also the source necessity information is increased in proportion thereto, and management is difficult when the source image in which different triangles overlap with each other is referred to. In this case, the source necessity information is allocated on not the source image basis but the triangle basis. In order to provide the least source necessity information, the source necessity information of about 1 bit is provided for each triangle. It is assumed that there is a masking when the triangle is completely overwritten, and there is no masking when a partial area is necessary as the output of the blended image. In fact, the source necessity information generating unit 108 executes the overlay determination on all of the pixels belonging to the triangle for each triangle, and reflects its result. That is, the source necessity information generating unit 108 generates, as the source necessity information, information indicative of only whether all of the pixels belonging to the polygonal shape data are overwritten, or not.

The source necessity information may be managed as described in the first embodiment, or may be written in an independent memory area, or written in the management information of the triangle basis input to the control information storing unit 111. Those manners are suitable for graphics rendering in which the number of triangles is large, and an average area thereof is sufficiently small. For example, those manners are effective for even a 3D image for animation if several frames are definitely repeated.

As described above, the third embodiment can be applied to the image processing apparatus such as the graphics engine that processes the polygonal source image data, and obtains the same advantages as those in the first embodiment.

(Fourth Embodiment)

A fourth embodiment is a modified example in which the processing of the blending layout information generation and the source necessity information generation in the first embodiment is partially changed. The operation of the fourth embodiment will be described with reference to FIGS. 4 and 6 used in the first embodiment.

The source read masking unit 110 detects whether there is a difference from the source necessity information before one frame or two frames with respect to the source image to be processed, or not. The detection unit may be the line basis or the block basis. In any case, a portion locally changed is extracted on a manageable basis. Hereinafter, a description will be given of a case in which a change in the source necessity information is detected and processed on the line basis.

Even if a combined output position in the blending process is changed, since the source necessity information before two frames is determined, the source necessity information before two frames may be always compared. However, if it can be detected according to a previous result that the source necessity information before one frame and before two frames is identical with each other, the source necessity information before one frame may be compared.

The source read masking unit 110 checks a line creating the difference as a result of comparing the source necessity information on the line basis. Then, the processing of the transform processing unit 1003 and the blend processing unit 1004 is executed on the line basis. When the source read masking unit 110 reads the source image from the source image memory 1010, the source read masking unit 110 executes the read masking with reference to the source necessity information on only the line determined to have no difference as a result of the above check. On the other hand, the line determined to have the difference is not read-masking. At the same time, the blending layout information generating unit 106 and the source necessity information generating unit 108 create updated blending layout information and updated source necessity information, respectively. With repetition of the above processing, even if the frame is updated, the minimum source image read can be executed.

For example, it is assumed that lyr3 is shifted by one line in the y-direction between the frames in FIG. 6. In this case, a tangent line y3 of an upper part and a tangent line y6 of a lower port are shifted by one pixel downward. When the processing is executed on the line basis, it is found that only the line information tangent to y3 and y6 with the above shift is different from that before one frame. Accordingly, if the source necessity information is provided in the source necessity information storing memory 109, the source necessity information on the previous frames can be used in generation of the source necessity information other than that on the above lines tangent to y3 and y6. On the contrary, in the above lines tangent to y3 and y6, the pixel data is read as it is without the source necessity information. Through the above processing, even if the frame is updated, and a position of the source image in the blended image is changed, the source necessity information can be reused without waiting for the updated source necessity information.

When a two-frame period is required for creation of the source necessity information as described in the first embodiment, there is a need to detect the difference from the frame before two frames. Further, because the source necessity information before two frames is necessary, a management of the source necessity information is problematic. This example shows that only one source necessity information is provided, and the information is overwritten every the frame is updated. However, another management may be executed without any problem.

In the above processing, since it is assumed that a change in the frame is fine, the source necessity information may not be used without detecting the difference in advance when an overall screen is changed. Also, although the line basis is assumed, the block basis may be applied without changing the manner.

In this way, according to the fourth embodiment, when a change in the blended image between the frames is small, the read masking control can be executed by using the source necessity information generated in the previous frame, and the throughput for generating the source necessity information can be reduced.

As described above, according to this embodiment, even when the process combining the transforming process and the blending process is implemented, the throughput necessary for generation of the source necessity information used for the read masking control of the source image data can be reduced, and an increase in the circuit scale and a reduction in the processing throughput can be suppressed. Accordingly, the process combining the transforming process and the blending process of the image is executed without causing an increase in the circuit scale and a reduction in the processing throughput. At the same time, data of the source image overwritten by the source image of the upper layer and disappearing is not read from the image memory, the occurrence of the useless memory access can be suppressed, and the necessary memory bandwidth can be reduced.

According to the present invention, modifications and applications by an ordinary skilled person on the basis of the disclosure of the present specification and known techniques without departing from the subject matter and scope of the present invention are also intended by the present invention, and included in a scope to be protected. Also, the respective components in the above embodiments may be arbitrarily combined together without departing from the subject matter of the present invention.

In the above respective embodiments, an example in which the present invention is configured by a hardware has been described. Alternatively, the present invention can be realized by a software.

Also, the respective functional blocks used in the description of the respective embodiments are realized as an LSI that is typically an integrated circuit. Each of those functional blocks may be configured by one chip, or a part or all of those functional blocks may be integrated into one chip. In this example, the chip is called the LSI, but may be called IC, system LSI, super LSI, or ultra LSI due to a difference in integration.

Also, a technique of the integrated circuit is not limited to the LSI, but may be realized by a dedicated circuit or a general-purpose processing unit. There may be used an FPGA (field programmable gate array) that is programmable after manufacturing an LSI, or a reconfigurable processing unit that can reconfigure the connection or setting of a circuit cell within the LSI.

Further, if a technology for integration circuit which is substituted for the LSI appears due to the development of the semiconductor technology or another technology derived therefrom, the functional blocks may be integrated by that technology. A biotechnology may be applied.

The present invention is based on Japanese Patent Application No. 2009-217527 filed on Sep. 18, 2009, and the contents of which are incorporated herein by reference.

Industrial Applicability

The present invention has an advantage that the occurrence of useless memory accesses can be suppressed by preventing data of unnecessary source images overwritten by the source image of the upper layer from being read from the image memory, without causing an increase in the circuit scale and a reduction in the processing throughput even in the process combining a transforming process and a blending process together. The image processing apparatus and the image processing method according to the present invention are useful for a device that executes the transforming process such as rotation, enlargement, reduction, a deforming process, or an image quality adjusting process, generates one display image through the blending process, and outputs the display image to a display device, and particularly, portable devices such as a cellular phone, a portable TV, or a notebook PC, a digital TV, a DVD/BD recorder, a desktop PC, and an on-vehicle navigation device.

DESCRIPTION OF REFERENCE NUMERALS 1000, image processing apparatus
1002, source unnecessity area calculating unit
1006, control information storing unit
1101, source address generating unit
1102, display address converting unit
1103, overlay determination unit
1104, source necessity determination unit
200, source image
201, 202, pixel block
210, transformed source image
211, pixel block
100, image processing apparatus
101, frame sequence unit
102, pipeline control unit
103, input counter
104, address converting unit
105, output counter
106, blending layout information generating unit
107, blending layout information storing memory
108, source necessity information generating unit
109, source necessity information storing memory
110, source read masking unit
111, control information storing unit
1001, memory input unit
1003, transform processing unit
1003a, rotation processing unit
1003b, resize processing unit
1003c, image quality adjustment processing unit
1003d, shape processing unit
1004, blend processing unit
1005, memory output unit
1010, source image memory
1020, blended image memory
311, source image lyr0
312, source image lyr1
313, source image lyr2
314, source image lyr2
320, blended image
321, transformed source image lyr1
322, transformed source image lyr2
323, transformed source image lyr3
324, pixel area
511, 512, pixel
521, 522, 523, pixel block
710, blending layout information bit format
720, blending layout information block size correspondence table
811, source necessity information on source image lyr0
812, source necessity information on source image lyr1
813, source necessity information on source image lyr2
814, source necessity information on source image lyr3
920, source necessity information block size correspondence table
1500, image processing apparatus
1506, blending layout information generating unit
1700, image processing apparatus
1703, transform processing unit
1705, memory input/output unit
1711, read/write masking unit
1810, attribute memory
1820, display screen
1821, 1822, 1823, pixel area
1830, image memory
1840, rendering circuit
1850, source image dividing process between v1 and v2

The invention claimed is:

1. An image processing apparatus, comprising:
a transform processing unit that receives a plurality of source images, and executes a transforming process on respective source images of the plurality of source images, individually;
a blend processing unit that executes a blending process on the plurality of transformed source images output by the transform processing unit, and generates a blended image;
a control information storing unit that stores control information related to the transforming process of the transform processing unit and the blending process of the blend processing unit;
a blending layout information generating unit that generates blending layout information indicative of overlay information on the plurality of transformed source images output from the transform processing unit in the transformed image;
a source necessity information generating unit that generates source necessity information indicative of unnecessary areas of the plurality of source images for overwriting through the blending process of the blend processing unit in the plurality of source images, with reference to the blending layout information output by the blending layout information generating unit;
a source necessity information storing memory that stores the source necessity information output by the source necessity information generating unit; and
a source read masking unit that a read masking control so as not to implement a read access to the source image data of the unnecessary area with reference to the source necessity information in the source necessity information storing memory at the time of reading the respective source images of the plurality of source images from an image memory.

2. The image processing apparatus according to claim 1, comprising: a control unit that sequentially processes a plurality of frames, activates the source read masking unit at the time of the frame processing subsequent to the frame processing in which the source necessity information is generated, executes the read masking control on the source image data of the unnecessary area by using the source necessity information stored in the source necessity information storing memory, wherein the control unit executes a process of activating the blending layout information generating unit to generate the blending layout information, and a process of activating the source necessity information generating unit to generate the source necessity information by using the blending layout information while repetitively executing the frame processing including the transforming process and the blending process, in one frame processing period or a plurality of frames processing period.

3. The image processing apparatus according to claim 2, wherein the control unit executes a process of activating the blending layout information generating unit to generate the blending layout information at the time of the frame processing of a first frame; wherein the control unit executes a process of activating the source necessity information generating unit to generate the source necessity information by using the blending layout information generated in the frame processing of the first frame, at the time of the frame processing of a second frame; and wherein the control unit executes a read masking control of activating the source read masking unit so as not to implement a read access to the source image data of an unnecessary area by using the source necessity information generated in the frame processing of the second frame, at the time of the frame processing of third and subsequent frames.

4. The image processing apparatus according to claim 2, wherein the control unit executes a process of activating the blending layout information generating unit to generate the blending layout information, and a process of activating the source necessity information generating unit to generate the source necessity information by using the generated blending layout information, at the time of the frame processing of a first frame; and wherein the control unit executes a read masking control of activating the source read masking unit so as not to implement a read access to the source image data of an unnecessary area by using the source necessity information generated in the frame processing of the first frame, at the time of the frame processing of second and subsequent frames.

5. The image processing apparatus according to claim 2, wherein the control unit refers to the control information related to the transforming process and the blending process at the time of starting the frame processing, and when the control information is different from the control information at the time of the previous frame processing, again executes the process of generating the blending layout information and the process of generating the source necessity information.

6. The image processing apparatus according to claim 2, wherein the control unit refers to the control information related to the transforming process and the blending process at the time of starting the frame processing, and when the control information is different from the control information at the time of the previous frame processing, again executes the process of generating the blending layout information and the process of generating the source necessity information with respect to only a different portion of the control information.

7. The image processing apparatus according to claim 1, wherein the processing of the source image of the upper layer is executed from a start of the processing of the source image of a lowermost layer lowest in display priority to the source image of an uppermost layer in order, for the generation of the blending layout information by the blending layout information generating unit, the generation of the source necessity information by the source necessity information generating unit, and the read masking control by the source read masking unit.

8. The image processing apparatus according to claim 1, wherein the transform processing unit includes an enlargement and shrinkage processing unit that executes an enlarging or shrinking process.

9. The image processing apparatus according to claim 1, wherein the transform processing unit includes a rotation processing unit that executes a rotating process.

10. The image processing apparatus according to claim 1, wherein the blending layout information generating unit generates identification number information indicative of a number of the necessary source image located at the bottom in the blending process as the blending layout information.

11. The image processing apparatus according to claim 1, comprising: a blending layout information storing memory that stores the blending layout information output by the blending layout information generating unit wherein the blending layout information storing memory stores the blending layout information on a block basis having a plurality of pixels.

12. The image processing apparatus according to claim 1, wherein the source necessity information storing memory stores the source necessity information on a block basis having a plurality of pixels.

13. The image processing apparatus according to claim 1, wherein the transform processing unit includes a shape processing unit that processes polygonal shape data, and deforms the source image according to the shape data.

14. The image processing apparatus according to claim 13, wherein the source necessity information generating unit generates, as the source necessity information, information indicative of only whether all of pixels belonging to the polygonal shape data are overwritten or not.

15. An image processing method comprising the steps of:
receiving a plurality of source images for storing as image data in an image memory; and
providing an image processing apparatus connected to said image memory to execute a process including the steps of:
reading the image data of the respective source images from the image memory,
executing a transforming process on the respective source images individually,
executing a blending process on the plurality of transformed source images to generate a blended image, the blending process including the step of generating blending layout information indicative of overlay information on the plurality of transformed source images in the blended image,
generating source necessity information indicative of unnecessary areas of the plurality of source images for overwriting through the blending process in the plurality of source image, with reference to the blending layout information, and
conducting a read masking control so as not to implement a read access to the source image data of the unnecessary area with reference to the source necessity information at the time of reading the image data of the respective source images from the image memory, wherein a plurality of frames is sequentially processed, and the read masking control is executed at the time of the frame processing subsequent to the frame processing in which the source necessity information is generated.

16. An image processing method comprising the steps of:

receiving a plurality of source images for storing as image data in an image memory; and providing an image processing apparatus connected to said image memory to implement a process including the steps of:

reading the image data of the respective source images from an image memory, executing a transforming process on the respective source images individually, executing a blending process on the plurality of transformed source images to generate a blended image, the blending process including the steps of sequentially processing a plurality of frames, executing a process of generating blending layout information indicative of overlay information in the blended image of the plurality of transformed source images in parallel to the transforming process and the blending process, at the time of the frame processing of a first frame, executing a process of generating the source necessity information indicative of an unnecessary area on the source image overwritten by the blending process in the plurality of source images, with reference to the blending layout information in parallel to the transforming process and the blending process, at the time of the frame processing of a second frame, and executing a read masking control of not implementing a read access to the image memory for the source image data in an unnecessary area with reference to the source necessity information when executing the transforming process and the blending process, at the time of the frame processing of third and subsequent frames.

* * * * *